US011799895B2

(12) United States Patent
Akella et al.

(10) Patent No.: US 11,799,895 B2
(45) Date of Patent: *Oct. 24, 2023

(54) ASSESSING COMPUTER NETWORK RISK

(71) Applicant: Netskope, Inc., Santa Clara, CA (US)

(72) Inventors: Srinivas Akella, San Jose, CA (US); Shahab Sheikh-Bahaei, Atherton, CA (US)

(73) Assignee: NETSKOPE, INC., Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/859,897

(22) Filed: Apr. 27, 2020

(65) Prior Publication Data

US 2021/0336982 A1 Oct. 28, 2021

(51) Int. Cl.
*H04L 9/00* (2022.01)
*H04L 9/40* (2022.01)
*G06F 16/22* (2019.01)

(52) U.S. Cl.
CPC .......... *H04L 63/1433* (2013.01); *G06F 16/22* (2019.01); *H04L 63/1425* (2013.01); *H04L 63/20* (2013.01)

(58) Field of Classification Search
CPC . H04L 63/1433; H04L 63/1425; H04L 63/20; G06F 16/22
See application file for complete search history.

(56) References Cited

U.S. PATENT DOCUMENTS

| | | | | |
|---|---|---|---|---|
| 2009/0210427 A1* | 8/2009 | Eidler | ................ | G06F 11/1484 |
| 2009/0325615 A1* | 12/2009 | McKay | ................ | H04W 4/14 |
| | | | | 455/466 |
| 2013/0191919 A1* | 7/2013 | Basavapatna | .......... | H04L 63/20 |
| | | | | 726/25 |
| 2014/0041032 A1* | 2/2014 | Scheper | ............. | H04L 63/1425 |
| | | | | 726/23 |
| 2017/0046519 A1* | 2/2017 | Cam | .................... | G06F 21/577 |

(Continued)

OTHER PUBLICATIONS

Babar Sachin, Proposed Security Model and Threat Taxonomy for the Internet of Things (IoT), Recent Trends in Network Security and Applications. CNSA 2010. Communications in Compute, and Information Science, vol. 89. Springer, Berlin, Heidelberg.

(Continued)

*Primary Examiner* — Christopher J Brown
(74) *Attorney, Agent, or Firm* — David R. Stevens; Stevens Law Group

(57) ABSTRACT

Systems and methods to determine an aggregate risk score are described. In one embodiment, a first dynamic risk factor and a second dynamic risk factor are generated associated with a first incident and a second incident respectively at a site. One or more static risk factors are retrieved from a database. The static risk factors and the dynamic risk factors are mapped to a first threat. A first threat risk score associated with the first threat is computed. A second risk score associated with a second threat is computed. A first total risk score associated with a first computing device included in a computer network associated with the site is computed. A second risk score associated with a second computing device included in the computer network is computed. The first total risk score and the second total risk score are aggregated to compute an aggregate risk score.

20 Claims, 17 Drawing Sheets

(56) References Cited

U.S. PATENT DOCUMENTS

2019/0222597 A1* 7/2019 Crabtree ........... H04L 43/08
2021/0312058 A1* 10/2021 Chiarelli ........... G06N 20/20

OTHER PUBLICATIONS

Cvitic Ivan, Classification of security risks in the IOT environment, Annals of DAAAM & Proceedings, 2015, p. 731+. Gale Academic OneFile, https://link.gale.com/apps/doc/A509682900/AONE?u=googlescholar&SID=AONE&xid=16239ced.
Burgenson Allen L, Risk Assessment and Management, Lonza Walkersville Inc.
Cybersecurity Assessment Tool, US Gov, May 2017.
Yu Tianlong, Handling a trillion (unfixable) flaws on a billion devices: Rethinking network security for the Internet-of Things, Carnegie Mellon University, CECA Peking University, 2015.
Amor David, EN ISO 14971:2012 risk assessment explained in 5 minutes . . . using the grossest example ever? VP at Pear Terapeutics, 2012.
The Internet of Things (IoT)—Threats and Countermeasures, CSO Online.
OWASP, IoT Vulnerabilities Project, https://owasp.org/www-project-internet-of-things/#tab=IoT_Vulnerabilities.
Securing the Internet of Things: Mapping Attack Surface Areas Using the OWASP IoT Top 10, RSA Conference, 2015, https://owasp.org/images/5/51/RSAC2015-OWASP-IoT-Miessler.pdf.
Nurse Jason R., Security risk assessment in Internet of Things systems, Univ. of Oxford, UK, 2017.
Liu Caiming, Research on Dynamical Security Risk Assessment for the Internet of Things inspired by immunology, SW Jiaotong University, 2012.
Farooq, M. U., A Critical Analysis on the Security Concerns of Internet of Things (IoT), International Journal of Computer Applications, 2015.
Poolsappasit Nayot, Dynamic Security Risk Management Using Bayesian Attack Graphs, IEEE Transactions on Dependable and Secure Computing, 2012.
Wang Lingyu, k-Zero Day Safety: A Network Security Metric for Measuring the Risk of Unknown Vulnerabilities, 2013.
Lippmann Richard P., Threat-Based Risk Assessment for Enterprise Networks, 2016.
Lippmann Richard P. Continuous Security Metrics for Prevalent Network Threats: Introduction and First Four Metrics, MIT, 2012.
Johnson Benjamin, The Complexity of Estimating Systematic Risk in Networks, IEEE 2th Computer Security Foundations Symposium, 2014.
Critical Security Controls V6.0, CIS (Center for Internet Security, 2016.
The Rapid7 Insight Platform, https://www.rapid7.com/products/insight-platform/.
Vulnerability Database, https://www.rapid7.com/db/?type=nexpose.
Mell Peter, A Complete Guide to the Common Vulnerability Scoring System Version 2.0, CVSS, 2007.
National Vulnerability Database, US Gov., https://nvd.nist.gov/vuln/search.
Ongkowijoyo Citra S., Understanding of Impact and Propagation of Risk based on Social Network Analysis, Procedia Engineering, 2018.
CSI Vulnerability Advisory, CIS, https://www.cisecurity.org/resources/advisory/.
Bro vs Snort or Suricata, Britica, 2018.
Emerging Threats, https://doc.emergingthreats.net/.
Cichonski Paul, Computer Security Incident Handling Guide, NIST, 2012.
Chickowski Ericka, Top 15 Indicators of Compromise, DarkReading.com, 2013.

* cited by examiner

ASSESSING COMPUTER NETWORK RISK

RELATED APPLICATIONS

This application is related to U.S. application Ser. No. 16/859,884 filed Apr. 27, 2020, which are incorporated herein by reference for all purposes.

BACKGROUND

Technical Field

The present disclosure relates to systems and methods that determine a risk assessment for one or more computing devices associated with a computer network.

Background Art

Currently, systems and methods used to determine a risk for one or more computing devices associated with a computer network are limited to analyzing a static risk associated with each computing device. Essentially, a static risk factor associated with each computing device is determined while considering a connectivity of the computing device in isolation. However, in a computer network, there exist multiple computing devices. A risk associated with one computing device in a network can directly or indirectly affect other computing devices in the network. Risk factors can also vary dynamically depending on how each device performs network access.

SUMMARY

Aspects of the invention are directed to systems, methods, and computer program products for assessing computer network risk.

In one aspect, a computer network includes a first computing device and a second computing device. A static risk score is computed for the first computing device. A first connectivity map corresponding to the first computing device is determined, while also analyzing communication performed by the first computing device via the connectivity map. A first dynamic risk score corresponding to the first computing device is computed. The first static risk score and the first dynamic risk score are combined to determine a first total risk score for the first computing device. Similar actions can be repeated for the second computing device to compute a second total risk score corresponding to the second computing device. The first and second total risk scores are aggregated into an aggregate risk score, which is used to determine a risk assessment associated with the computer network.

In another aspect, computer network risk assessment is determined for a computer network that includes a first computing device, a second computing device, a network gateway communicatively coupled to the computer network, a computing system communicatively coupled to the network gateway (and configured to receive network data associated with the computer network via the network gateway), and a database configured to store data associated with one or more risk factors.

In a further aspect, an aggregate risk score is determined for a computer network associated with a site and that includes a first computing device and a second computing device. A first dynamic risk factor associated with a first incident and a second dynamic risk factor associated with a second incident are generated at the site. One or more static risk factors are retrieved from a database. The one or more static risk factors, the first dynamic risk factor, and the second dynamic risk factor are mapped to a first threat. A first threat risk score associated with the first threat is computed. A second threat risk score associated with a second threat is computed. A first total risk associated with the first computing device is calculated based on the first threat risk score and the second threat risk score. A second total risk associated with the second computing device. The first total risk and the second total risk are aggregated to compute the aggregate risk score associated with the site.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
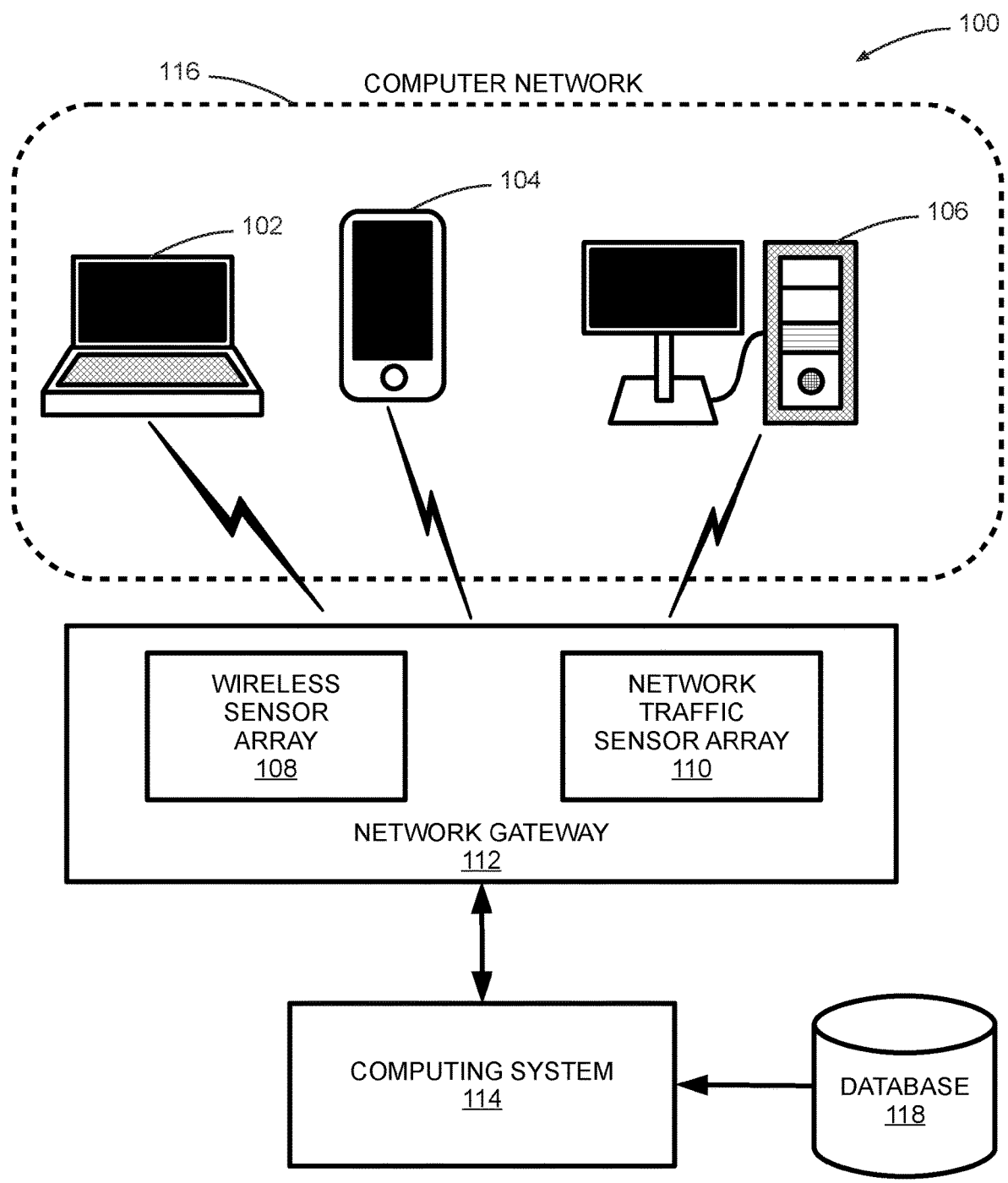
FIG. 1 depicts an example computer architecture of a network risk assessment system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Many network risk analysis/measurement mechanisms rely on static risk factors and fail to account for transient or dynamic network attributes. These risk analysis/measurement mechanisms can determine a computing device risk score as a property of its operating system, its vulnerabilities, ports open, its applications risk, and the communication it performs that affect its riskiness. However, across a set of connected electronic devices, an increase in one or more of: the number electronic devices, the number of different electronic (i.e., computing) device types being utilized, the number of different communication protocols (e.g., WiFi, ZigBee, Bluetooth, Bluetooth Low Energy (BLE)) being utilized, or the number of different cellular networks being utilized can reduce the accuracy of risk scoring measurements.

On the other hand, aspects of the inventions determine a computer network risk score that takes into account an interconnectedness of existing computing devices in a computer network, including considering how a risk associated with one computing device affects other computing devices in the computer network.

The systems and methods described herein relate to risk assessment associated with a computer network. A method for dynamic risk assessment and propagation analyzes a set of networked computing devices included in a computer network. The analysis can be based on threats detected in data communication traffic associated with each computing device, as well as corresponding communication patterns across multiple spectra and protocols. In some embodiments, a risk assessment is determined from a combination of a static risk score and a dynamic risk score associated with each device included in the computer network. In other embodiments, an aggregate risk score for a computer network is determined based on one or more static risk factors and one or more dynamic risk factors. Considering both static and dynamic scores and risk factors facilitates characterizing how each computing device in the computer network influences and is influenced by other computer devices in the computer network. For example, aspects of the invention can consider one or more risk factors generated by one or more threats to the computer network.

FIG. 1 depicts an example computer architecture 100 of a network risk assessment system. As depicted, computer architecture includes computer network 116, computer system 114, network gateway 112, and database 118. Network gateway 112 further includes wireless sensor array 108 and network traffic sensor array 110. Computer network 116 further includes computing device 102, computing device 104, and computing device 106.

Each of computing devices 102, 104, and 106 may communicate over computer network 116 and may be communicatively coupled to network gateway 112 via any combination of wired or wireless connectivity protocols, as described herein. Computer devices in computer network 116, including computing devices 102, 104, and 106, as well as computing device 114 are communicatively coupled to network gateway 112. Computing system 114 is also communicatively coupled to database 118.

Computing devices 102, 104, and 106 and computer system 114 (as well as any other computing devices included in computer network 116 and/or otherwise connected to network gateway 112) can include any combination of desktop computers, laptop computers, mobile devices, such as, tablets and cellular phones, internet-of-things (IoT) devices, or any other computing devices. Thus, in general, computer network 116 can include one or more internetworked computing devices, each including a processor or a processing system and system memory.

In an aspect, a computing device may be classified into one or more of the following categories:

Accessories: Small, low-power devices (e.g., computer mice).
Networking equipment: Devices dedicated to networking purposes (e.g., network switches, network routers).
Mobile phone: Cellular phones.
Low-power computer: Devices like tablets, Raspberry Pi computers, etc., that are essentially low-power computers.
Computer: High-power computing devices such as laptops, notebooks, desktops, etc.
Organization device: A device belonging to an organization that implements the systems and methods described herein.
Audio/Video: An audio/video device such as a video camera, a still camera, a Bluetooth speaker, a conference phone, Bluetooth headsets, etc.
Server: A computing server.
Medical health: Medical/health devices (e.g., pulse oximeters, oxygen sensors, etc.).
Printing: Printing devices such as printers.
Home: Appliances used in homes or kitchens such as refrigerators, dishwashers, and laundry machines.
Imaging: Devices that produce images as outputs (e.g., scanners and cameras).
Uncategorized: Devices with unknown types, functions, or categorization (e.g, uncategorized Bluetooth devices).
Location service: A service used for locating a computing device (e.g., iBeacon by Apple).
Security: E.g., a badge, a physical access control device such as a keycard, etc.
Gaming: Gaming devices (e.g., gaming consoles and gaming controllers).

Computing devices 102, 104, and 106 can communicate over computer network 116 using any combination of wired and/or wireless communication protocols. For example, computing devices can use a wired communication protocol, such as, Ethernet. Computing devices can also use wireless communication protocols, such as, WiFi, Bluetooth, Bluetooth Low Energy (BLE), ZigBee, Long-Term Evolution (LTE), Lorawan, zwave, etc. Network gateway 112 receives network communication data from any of computing devices 102, 104, and 106 using wireless sensor array 108 and network traffic sensor array 110. Wireless sensor array 108 can be configured to transfer network communication data using any of the described wireless communication protocols. Network traffic sensor array 110 can be configured to transfer network communication data using any of the described wired network communication protocols.

In some embodiments, communication data associated with computing devices 102, 104, and 106 is collectively received by network gateway 112 and transmitted to computing system 114. Computing system 114 receives and analyzes the communication data. Computer system 114 can perform a risk assessment and determine a computer network threat risk associated with each of computing device 102, 104, and 106 and associated with computer network 116.

In some embodiments, computing system 114 is configured to receive network data associated with computer network 116 via network gateway 112. Computing system 114 computes a first static risk score corresponding to a first computing device (e.g., computing device 102). A static risk score associated with a computing device can be a measure corresponding to one or more static risk factors associated with the computing device. Database 118 communicatively may be configured to store the one or more static risk factors. In embodiments, static risk factors are collected from vulnerability scan results associated with one or more computing devices in computer network 116. The static risk factors are then mapped to threat categories. One or more static risk factors generated by more recent vulnerability scans can overwrite any existing static risk factors from less recent vulnerability scans stored in database 118. In other words, static risk factors stored in database 118 essentially expire when a new vulnerability scan is performed.

Vulnerability scans can measure a risk of a computing device as a property of its operating system, vulnerabilities, ports open, its applications risk, and the communication it performs which affect its riskiness. Properties included in a computation of a static risk score can include an operating system associated with the computing device, open ports, application risks, and activities the computing device performs over protocols like http, https, email and other protocols, as well as over multiple communication spectra.

In some embodiments, computing system 114 determines a first connectivity map corresponding to the first computing device. A connectivity map associated with a specific computing device can be a set, or listing, of all computing devices in an associated computer network and/or outside of the associated computer network that the specific device is directly or indirectly communicatively coupled to. In computer architecture 100, a connectivity map associated with computing device 102 can include computing device 104 and computing device 106, and other computing devices outside of computer network 116 (e.g., web servers). A connectivity map indicates how a computing device communicates with its peers in the computer network and outside of the computer network. Based on device communication, the computing device propagates (or transposes) risk to other computing devices within the computer network. Thus, one computing device can dynamically influence risk associated with one or more other computing devices.

Similarly, an overall risk for a computing device is dynamically influenced by risk factors associated with the other computing devices. Dynamic influences between computing devices provide a basis for computing dynamic risk scores and dynamic risk factors from analyzed network communication. An overall risk associated with a computing device can be computed from a combination of an associated static risk and dynamic risk. The overall risk may also be influenced by a transposed inherited risk that can vary dynamically depending on individual risk factors and transposed risk factors from any other computing devices connected to the computing device. The computing devices can be either intra-network, inter-network connected, or connected across the cloud or internet or a combination of network, cloud and internet-connected devices.

For the first computing device in computer network 116, computing system 114 analyzes communication performed by the first computing device via the first connectivity map associated with the first computing device. Computing system 114 computes a first dynamic risk score associated with the first computing device responsive to the analysis. In some embodiments, a dynamic risk score is associated with one or more dynamic risk factors generated by one or more incidents. The one or more dynamic risk factors may be stored in database 118.

Computing system 114 may aggregate the first static risk score and the first dynamic risk score to generate a first total risk score for the computing device. Computing system 114 computes a second total risk score corresponding to a second computing device (e.g., computing device 104). This process is repeated for all other devices in computer network 116. Computing system 114 aggregates all total risk scores into an aggregate risk score corresponding to computer network 116. Computing system 114 determines a risk assessment associated with computer network 116 based on the aggregate risk score.

Some embodiments of the systems and methods described herein measure a risk of a computing device across multiple communication spectra and transpose this risk to other computing devices in an associated computer network. This enables an accurate representation of risk and riskiness in that set of interconnected computing devices. Different aspects of controlling access to the computing device and the computer network are associated with different functional teams under an IT/Security umbrella. Hence, any risk assessment that is performed is not just a factor of device risk but should also be expressed as a risk assessment against the functional teams in the organization (e.g., IT as a functional team). Risk assessment may be expressed as a score associated with a computing device and an associated user, and/or a score for each functional branch of the organization responsible for the device operation and access. All computed scores for a computing device and the associated functional teams may be represented as a risk score for that site. Any risk scores of each site may be represented as a score for the organization that is comprised of multiple sites.

In some embodiments, an algorithm to determine risk associated with a network of connected computing devices first determines a risk for each computing device based on individual factors associated with the device, such as operating system, open ports, application risks, activities the computing device performs over protocols like http, https, email, and other protocols, and over multiple communication spectra. Once a risk due to the individual factors is established, the algorithm analyzes how this computing device communicates with its peers in the network of connected devices. Based on this communication, an individual risk associated with the computing device is transposed to neighboring computing devices. This is done across all the computing devices in that set of connected networked computing devices till a dynamic risk propagated across all the computing devices in the network is established. A risk associated with a computing device by itself and also as a set of its risk and the transposed inherited risk can go up or down dynamically based on variations in individual factors and transposed risk factors from the devices the computing device is connected to. The computing devices can be either intra-network connected, inter-network connected, or connected across the cloud or internet or a combination of network, cloud and internet connected devices.

A computed risk may be expressed as a risk assessment of functional departments of an associated IT organization. For example, IT may be responsible for installing antivirus software, backup, encryption, patch and configuration management software in one or more computing devices. Hence, a risk assessment of these services not installed or older versions installed should reflect as assessment of IT Operations functions of the IT organization. Similarly, incident response speeds, vulnerability reports, and malware incidents may be assessed against a Security Operations team. Access to network and segmentation-associated risks may be assessed against a Network operations group.

Figure 2:
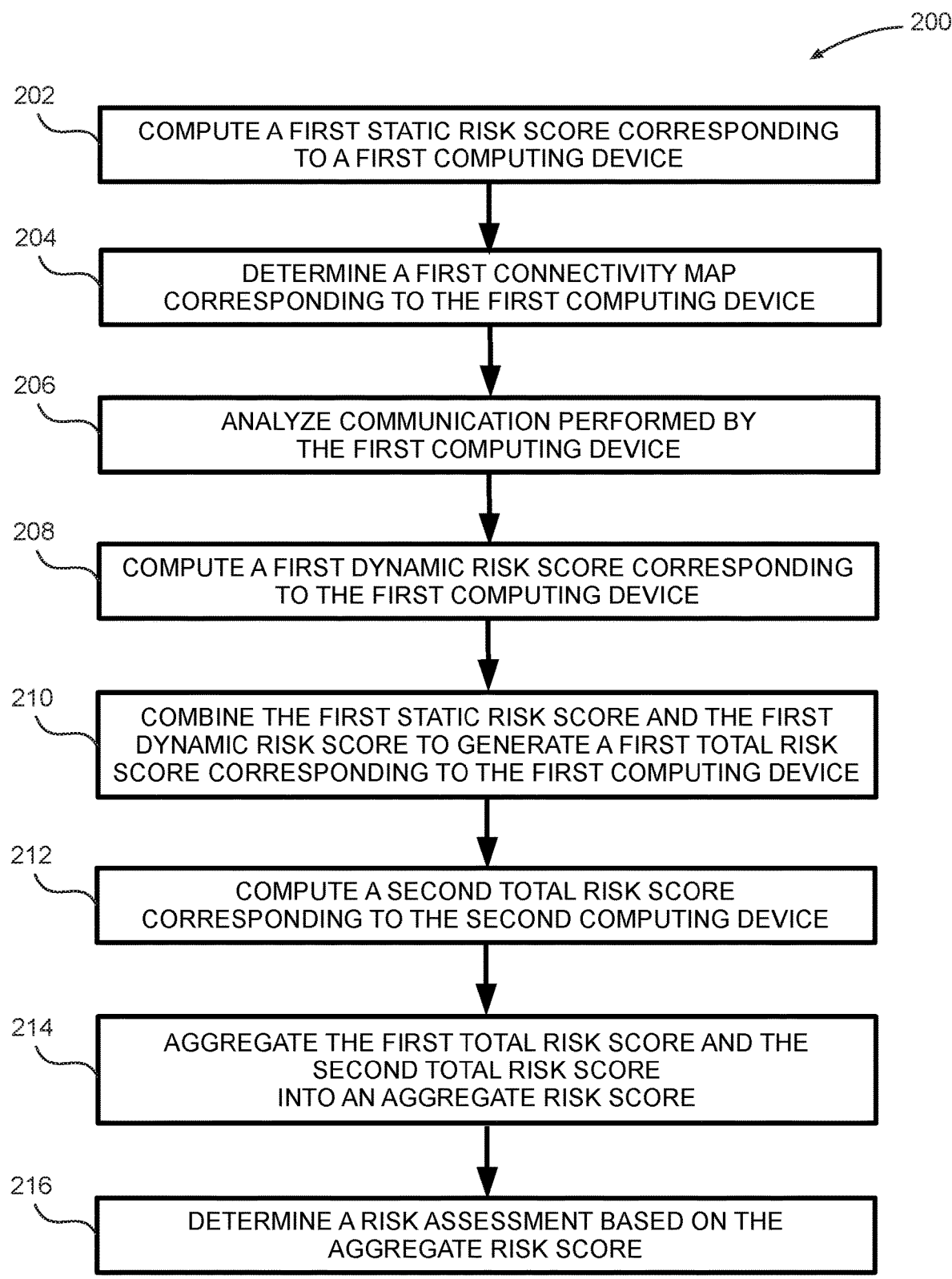
FIG. 2 depicts a flow diagram of an example method for determining a risk assessment.

FIG. 2 depicts a flow diagram of an example method 200 for determining a risk assessment. In some embodiments, method 200 may be implemented using computing system 114, and the risk assessment may be performed on a computer network such as computer network 116. Method 200 incudes computing a first static risk score corresponding to a first computing device (202). For example, computing system 114 can compute a static risk score corresponding to computing device 102 in response to receiving network communication data via gateway 112. The network communication data may be associated with computing devices 102, 104, 106, or any other computing device in computer network 116.

Method 200 includes determining a first connectivity map corresponding to the first computing device (204). For example, computing system 114 can determine a connectivity map corresponding to computing device 102. The connectivity map may include other computing devices in the computer network and computing devices outside of the computer network.

Method 200 includes analyzing communication performed by the first computing device via the connectivity map (206). For example, computing system 114 can analyze communication performed computing device 102 via the connectivity map. Method 200 includes computing a first dynamic risk score corresponding to the first computing device and responsive to the analysis (208). For example, computing system 114 can compute a dynamic risk score for computing device 102 responsive to corresponding analyzed communication of computing device 102. Method 200 includes combining the first static risk score and the first dynamic risk score to generate a first total risk score corresponding to the first computing device (210). For example, computing system 114 can combine a static risk score and a dynamic score for any of computing device 102 to generate a corresponding total risk score for computing device 102.

Method 200 incudes computing a second total risk score corresponding to a second computing device (212). For example, computing system 114 can generate a total risk score for computing device 104 or computing device 106. Thus, in some embodiments, the first computing device and the second computing device may be a part of a computer network (e.g., computer network 116). Method 200 includes aggregating the first and second total risk scores into an aggregate risk score corresponding to the computer network (214). For example, computing system 114 can aggregate a total risk score for computing device 102 and a total risk score for computing device 104 into an aggregate risk score for network 116. Method 200 includes determining a risk assessment associated with the computer network based on the aggregate risk score (216). For example, computing system 114 can determine a risk assessment associated with network 116 based on the aggregated risk score for network 116.

In a set of connected devices communicating with each other, risk assessment can include determining a risk value of each individual computing device. A risk value for a computing device can be based at least in part on individual risk associated with the computing device and based at least in part on risk inheritable from other computing devices communicating with the computing device over the computer network. An individual risk for a computing device may be calculated based on multiple factors including human behavior (e.g. connection unsecure WiFi, unsecure surfing, etc.), anomalous behavior (mac address spoofing, unusual protocols/ports used, etc.), known/published vulnerabilities (e.g. Emerging Threats, Network Vulnerability Database (NVD), NIST, etc). The individual risk may also be influenced by individual factors such as an operating system associated with the computing device, open ports, application risks, activities the computing device performs over protocols like http, https, email, and other protocols and over multiple communication spectra.

Along with computation of an individual risk due to one or more individual factors, further analysis can determine how the computing device communicates with other devices in the computer network. Based on inter device communication, a risk associated with the computing device is transposed to neighboring devices in the computer network. Risk transposition may be done for one or more or even all the computing devices in the computer network). In one aspect, t risk is transposed across an entire graph of nodes representing a computer network. Transposed risk may indicate an overall computer network risk to an IT department associated with the computer network A historical record of the risks on a per-device basis can also be maintained.

Computer network risk can be reduced by isolating any higher risk computing devices and/or changing the other devices higher computing devices are connected with. In one aspect, higher risk computing devices are computing devices having risk above a threshold risk.

A methodology used to determine and control risk to critical devices in a network from the risky connections may include the following features:

(a) An individual risk score calculation for each computing device across multiple communication spectra and protocols like WiFi, Bluetooth, Bluetooth Low Energy (BLE), ZigBee, Long-Term Evolution (LTE), Lorawan, zwave, and so on.

(b) For each computing device, a risk is calculated across all the multiple spectra and protocols that the computing device supports.

(c) Transposing of risks across the entire connected set of computing devices based on connectivity to each other and the type of data being exchanged. The risk is propagated across all the multiple spectra and protocols that a computing device supports. The risk is propagated across any combination of the intra-network, inter-network, cloud and the internet.

(d) A computed risk is used to graphically represent the risk across the connected set of devices. This can be used to find how the risk of critical devices in the network can be controlled by controlling how they communicate with their peers. This graphical representation of risk propagation is done across all the multiple spectra and protocols that the device supports.

(e) A risk is assessed against the functional teams responsible for the security and control of the computing device and the overall risk score of the location, thereby providing a comprehensive risk assessment for the computer network.

Figure 3:
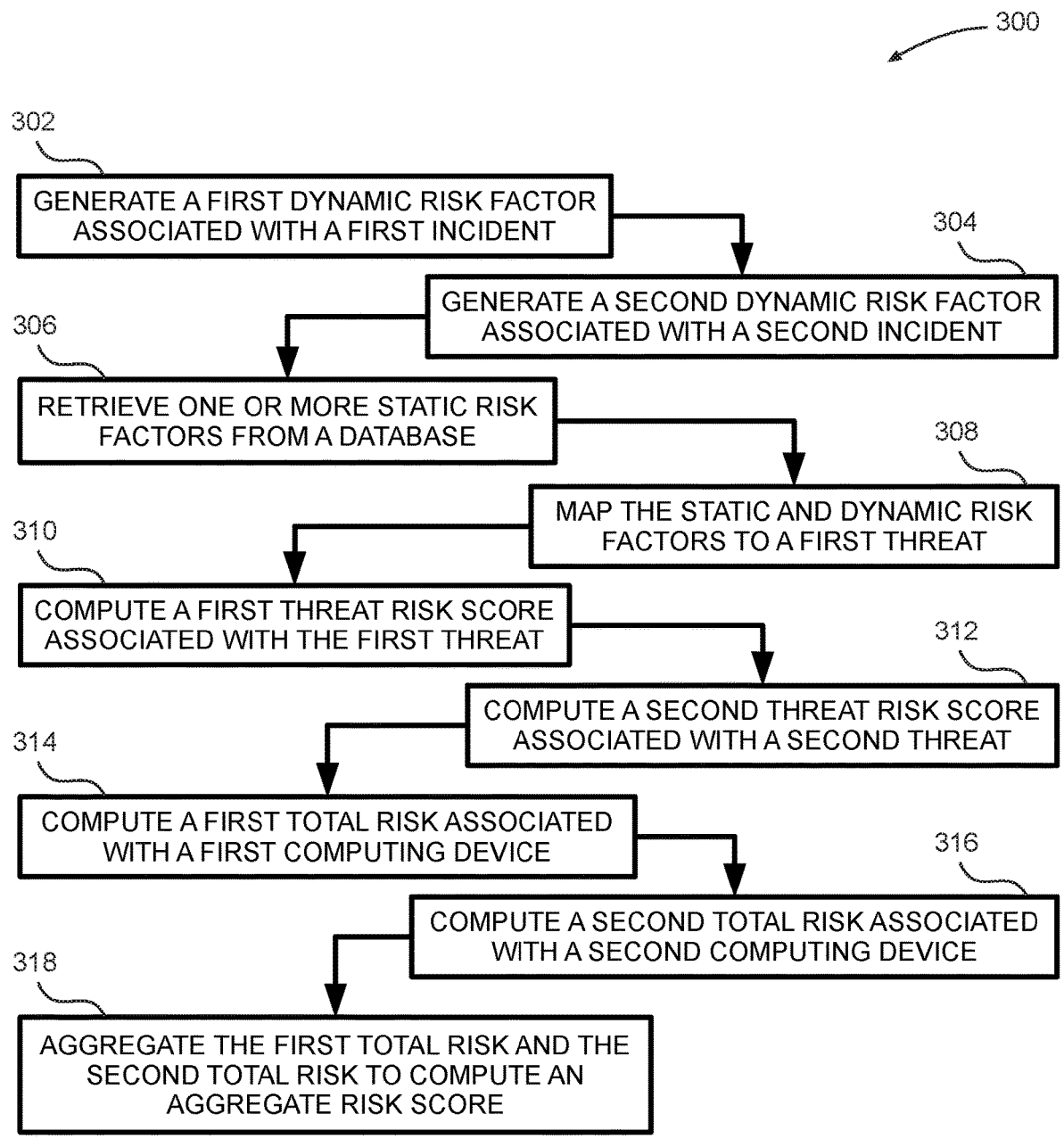
FIG. 3 depicts a flow diagram of an example method for determining an aggregate risk score.

FIG. 3 depicts a flow diagram of an example method 300 for determining an aggregate risk score. In some embodiments, method 300 may be implemented using computing system 114 configured to receive communication data associated with computer network 116 via network gateway 112. The following definitions are applicable to method 300 (terms "device" or "computing device," and "network," "computer network," or "computing network" are used interchangeably):

Risk Factor: An atomic security condition that could potentially be an indication of a threat. A risk factor can be dynamic or static.

Dynamic risk factor: A security incident detected from network traffic associated with a computing device (anomaly, malware signature matching, behavior, etc.).

Static risk factor: A security condition detected by scanning the computing device (configuration, operating system, etc.).

Threat: A way or ways in which attackers could potentially cause harm to the organization.

Threat Category: Threats are categorized into the following categories:

General (low priority) threat
Attackers compromise unauthorized computing devices
Attackers compromise unauthorized or prohibited software
Attackers exploit known software vulnerabilities
Attackers exploit insecure configurations
Attackers launch insider attacks
Attackers steal credentials and exploit weak authentication
Attackers exploit account and physical access privileges
Users perform actions that enable attacks
Attackers penetrate network boundaries, sensitive information exits network boundaries
Attackers gain knowledge about the computer network
Weak IT compliance enable attacks
Weak asset management practices
Weak Network configurations enable attacks Risk Score (device): Overall score calculated for a computing device (e.g., between 0 and 100) indicating the risk imposed by this computing device to the organization.

A general form of method 300 includes the following steps:

1. Dynamic risk factors are collected from one or more incidents streams (Emerging Threats, BT and BLE vulnerabilities and anomalies) and mapped to the threat categories described above.

2. Static risk factors are collected from vulnerability scan results (e.g., Openvas) and mapped to threat categories.

3. Collected risk factors are stored up to 30 days.

4. Risk score is calculated for each threat category; and

5. Total risk score is calculated by combining threat risks.

More specifically, method 300 includes generating a first dynamic risk factor associated with a first incident at a site (302). In some embodiments, an incident may be an event associated with a computing device communicating over a computer network. In particular embodiments, the computer network may be associated with a site (e.g., a campus, an office space, a hospital, or any other physical location where the computer network is implemented). In some embodiments, a site may also be referred to as an "organization." For example, computing system 114 may compute the first dynamic risk factor responsive to determining an occurrence of a first incident based on communication data associated with computer network 116. This communication data may be received via network gateway 112.

Method 300 includes generates a second dynamic risk factor associated with a second incident at the site (304). Method 300 includes retrieving one or more static risk factors from a database such as database 118 (306). These one or more static risk factors may be retrieved by computing system 114. Method 300 incudes mapping the one or more static risk factors, the first dynamic risk factor, and the second dynamic risk factor to a first threat (308). For example, this mapping may be performed by computing system 114. Method 300 includes computing a first threat risk score associated with the first threat (310). Method 300 includes computing a second threat risk score associated with a second threat (312). For example, computing the first and the second threat risk scores may be performed by computing system 114.

Method 300 includes computing a first total risk associated with a first computing device (e.g., computing device 102) based on the first threat risk score and the second threat risk score (314). In some embodiments, the first computing device is included in a computer network (e.g., computer network 116) that is associated with the site. Method 300 includes computing a second total risk associated with a second computing device (e.g., computing device 104) included in the computer network (316). For example, computing system 114 may compute the first total risk and the second total risk.

Method 300 includes aggregating the first total risk and the second total risk to compute an aggregate risk score associated with the site (318). For example, this aggregation may be performed by computing system 114.

Figure 4:
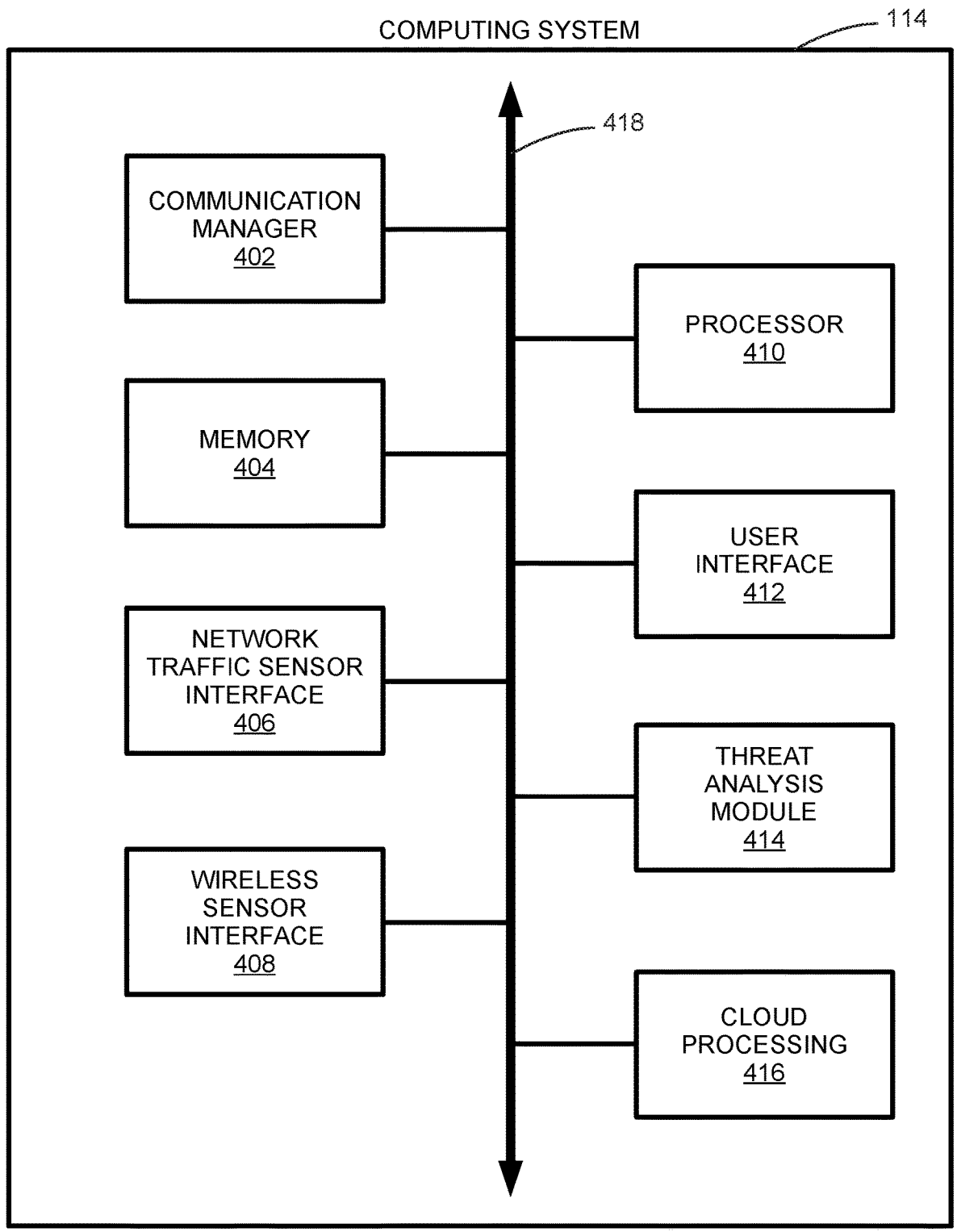
FIG. 4 depicts an example architecture of a computing system.

FIG. 4 depicts an example architecture of computing system 114. Computing system 114 may be used to enable processing functions associated with the different embodiments presented herein. As described, computing system 114 may perform functions associated with method 200 or method 300. As depicted, computing system 114 includes communication manager 402, memory 404, network traffic sensor interface 406, wireless sensor interface 408, processor 410, user interface 412, threat analysis module 414, cloud processing 416, and data bus 418.

Communication manager 402 can be configured to manage communication protocols and associated communication with external peripheral devices as well as communication with other components in computing system 114. For example, communication manager 402 may be responsible for generating and maintaining a communication interface between computing system 114 and network gateway 112.

Memory 404 is configured to store data associated with the risk assessment applications described herein. Memory 404 may include both long-term memory and short-term memory. Memory 404 may be comprised of any combination of hard disk drives, flash memory, random access memory, read-only memory, solid state drives, and other memory components.

Network traffic sensor interface 406 enables computing system 114 to interface and communicate with network traffic sensor array 110. Wireless sensor interface 408 enables computing system to interface and communicate with wireless sensor array 108.

Processor 410 is configured to perform functions that may include generalized processing functions, arithmetic functions, and so on. Processor 410 is configured to process information associated with the systems and methods described herein.

User interface 412 allows a user to interact aspects of the invention described herein. User interface 412 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Threat analysis module 414 is configured to perform operations related to risk assessment.

Aspects of the invention may include cloud computing, where certain functions associated with risk assessment are computed on cloud servers. Cloud processing 416 can be configured to facilitate cloud based operations.

Data bus 418 communicatively couples the different components of computing system 114, and allows data and communication messages to be exchanged between these different components.

Figure 5:
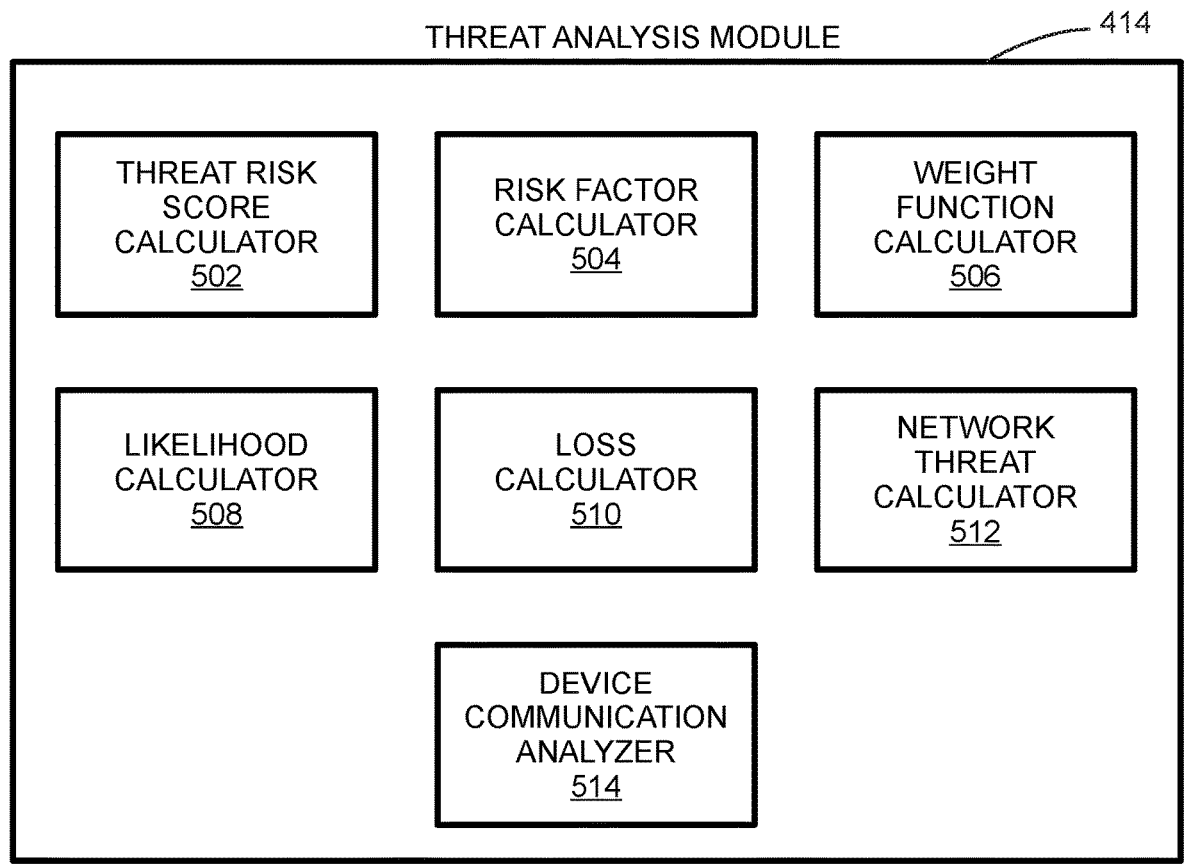
FIG. 5 depicts an example computer architecture of a threat analysis module.

FIG. 5 depicts an example computer architecture of threat analysis module 414. As depicted, analysis module includes threat risk score calculator 502, risk factor calculator 504, weight function calculator 506, likelihood calculator 508, loss calculator 510, network threat calculator 512, and communication analyzer 514.

Threat risk score calculator 502 can be configured to calculate a threat risk score associated with a threat. A threat risk score may be calculated by the following formula:

$$\text{threat risk score} = (\text{likelihood of threat happening}) \times (\text{loss if threat occurs})$$

Risk factor calculator 504 can be configured to compute one or more risk factors associated with a threat based on an age of an incident associated with the threat and a severity of the threat. In embodiments, a risk factor is a security condition that could potentially be an indication of a threat. It can be dynamic or static, and is mathematically defined as a tuple:

$$\text{risk factor: } rf = (age, severity, uniquekey)$$

where:
age is an age of the incident if it is a 'dynamic' factor; otherwise for 'static' factors it is defined as a time elapsed since last packet activity. If no traffic (packet activity) is detected for a device, then age is set to a large number (e.g. 9999) such that the weight of risk factor takes on a value close to zero. The rationale is that devices with no packet activity pose no threat even if they have 'static' security conditions.
severity is valued between 0 and 1, calculated as a function of inherent severity of the risk-factor.

Assuming several risk-factors contribute to a threat, a set $RT_i$ is defined as:

risk factors contributing to threat 1:
$$RT_1 = \{rf_{1,1}, rf_{1,2}, \ldots, rf_{1,n_1}\}$$

risk factors contributing to threat 2:
$$RT_2 = \{rf_{2,1}, rf_{2,2}, \ldots, rf_{2,n_2}\}$$

. . .

risk factors contributing to threat m:
$$RT_m = \{rf_{m,1}, rf_{m,2}, \ldots, rf_{m,n_m}\}$$

Weight function calculator 506 can be configured to calculate a weight function dependent at least in part on an age associated with a threat. For each threat i a weight is calculated as a function of total count of contributing risk-factors and their age:

$$w_i = \Sigma n_k e^{-f(age_k)}$$

where f=forget-factor

This weight is higher for threats with a larger number of recent contributing risk-factors. An average-age of threat i is calculated as:

$$averageage_i = \frac{1}{n_i}\sum age_k$$

Likelihood calculator 508 can be configured to compute a likelihood of a threat. A computed likelihood may be dependent on an average daily occurrence rate of one or more risk factors contributing to the threat. A likelihood of a threat may be estimated based on a count of relevant risk-factors, how often they happen, and their age. Mathematically, likelihood of threat i may be modeled using a Poisson distribution:

$$\text{likelihood of threat}_i = 1 - e^{-\lambda_i}$$

where $\lambda_i$ is an average daily occurrence rate of risk-factors contributing to threat i. A likelihood of threat i is a probability of the threat occurring more than 0 times during the next 24 hours, which is 1−probability of 0 occurrence. Assuming security incidents have Poisson distribution, the following equation can be applied:

$$\text{probability of } k = 0 \text{ occurrence} = e^{-\lambda}\frac{\lambda^k}{k!} = e^{-\lambda}$$

Loss calculator 510 can be configured to compute a loss associated with a threat based on a weighted severity and an impact associated with the threat:

loss=(weighted severity)×(impact)

In embodiments, weighted severity (ws) for threat i is calculated as:

$$\text{weighted severity } i : ws_i = \frac{\sum severity_k e^{-f(age_k)}}{\sum e^{-f(age_k)}}$$

where $severity_k$ and $age_k$ are attributes of risk factor k for all risk factors contributing to threat i.

In embodiments, severity may be weighted based on an age of contributing risk factors. A weighted severity is higher for threats with more recent risk factors. In some embodiments, an impact may be calculated based on a device hyper context (defined subsequently) and impact of the threat itself. At the end the raw risk scores are normalized using a logistic function and scaled to 0-100.

A hyper context of a computing device is defined as a characterization of multiple contexts pertaining to physical, logical, functional, and organizational parameters, location, and one or more traffic patterns, risk assessments, audits, alerts etc. Examples include:

Physical interfaces of a computing device with an associated operating spectrum for each interface,
Type and category of the computing device,
Operating system, patch level, services, and applications running on the computing device,
Functionality or the "purpose in life" of the computing device,
Microlocation of the computing device, including its mobility patterns and times of visibility,
Ownership information of the computing device, and
Control information (auto vs user) associated with the computing device.

Network threat calculator 512 can be configured to derive a computer network risk score associated with a computer network threat risk. The computer network may include a plurality of computing devices. Network threat calculator 512 can be configured derive the computer network risk score based on multiple risk scores, multiple risk factors, multiple weight functions, multiple likelihoods, and multiple loss functions. In embodiments, each set comprising a risk score, a risk factor, a weight function, a likelihood and a loss function may correspond to a unique computing device in the computer network.

Given n threat risk scores, overall risk score is calculated as:

total risk=(overall likelihood)×(overall severity)× (overall impact)

where each component is calculated as follows:

overall severity=max({severity$_1$,severity$_2$, ... })

overall impact=mean({impact$_1$,impact$_2$, ... })

overall likelihood=1−Π1−likelihood$_i$

The above description of risk calculation may be applied to one or more interfaces associated with a computing device. When a computing device has several interfaces, threat risks from different interfaces may be combined to compute device level scores.

When a threat i exists for two interfaces in the same computing device, a combined risk of that threat is calculated as follows. A combined likelihood is calculated using an overall average daily occurrence:

$$\text{average daily occurrence} = \lambda_i = \frac{count_1 + count_2}{\text{number of days}}$$

likelihood of threat$_i$=1−$e^{-\lambda_i}$

A weighted severity is calculated as:

$$\text{weighted severity}_i : ws_i = \frac{\sum severity_k e^{-f(age_k)} + \sum severity'_k e^{-f(age'_k)}}{\sum e^{-f(age_k)} + \sum e^{-f(age'_k)}}$$

An associated impact either remains the same, or is recalculated based on a device hyper context. Then, risk$_i$=(likelihood$_i$)(weightedseverity$_i$)(impact$_i$)

After all threat risks are calculated, total risk is calculated by combining threat risks as described above. Communication analyzer 514 can be configured to analyze communication data received via network gateway 112. In some embodiments, device communication analyzer 514 may perform functions such as classifying a type of communication performed by a computing device associated with computer network 116. Such a classification may include determining whether the computing device is accessing an external website, how safe the website is (e.g., website reputation), the length of the communication and the quality and quantity of data exchanged, and so on. In some embodiments, device communication analyzer 514 may be configured to generate a conceptual graphical representation of how computing devices associated with a computer network are interconnected. This graphical representation can be used to generate a map of how data flows, and how different risk factors are dynamically propagated throughout the computer network.

In general, a device risk-score calculation can include:
1. A risk score is calculated for each threat category
2. Threat risks are combined into one overall score In some embodiments, custom machine learning algorithms transpose risk due to each connection back to each computing device across the whole computer network, based on connectivity.

Figure 6:
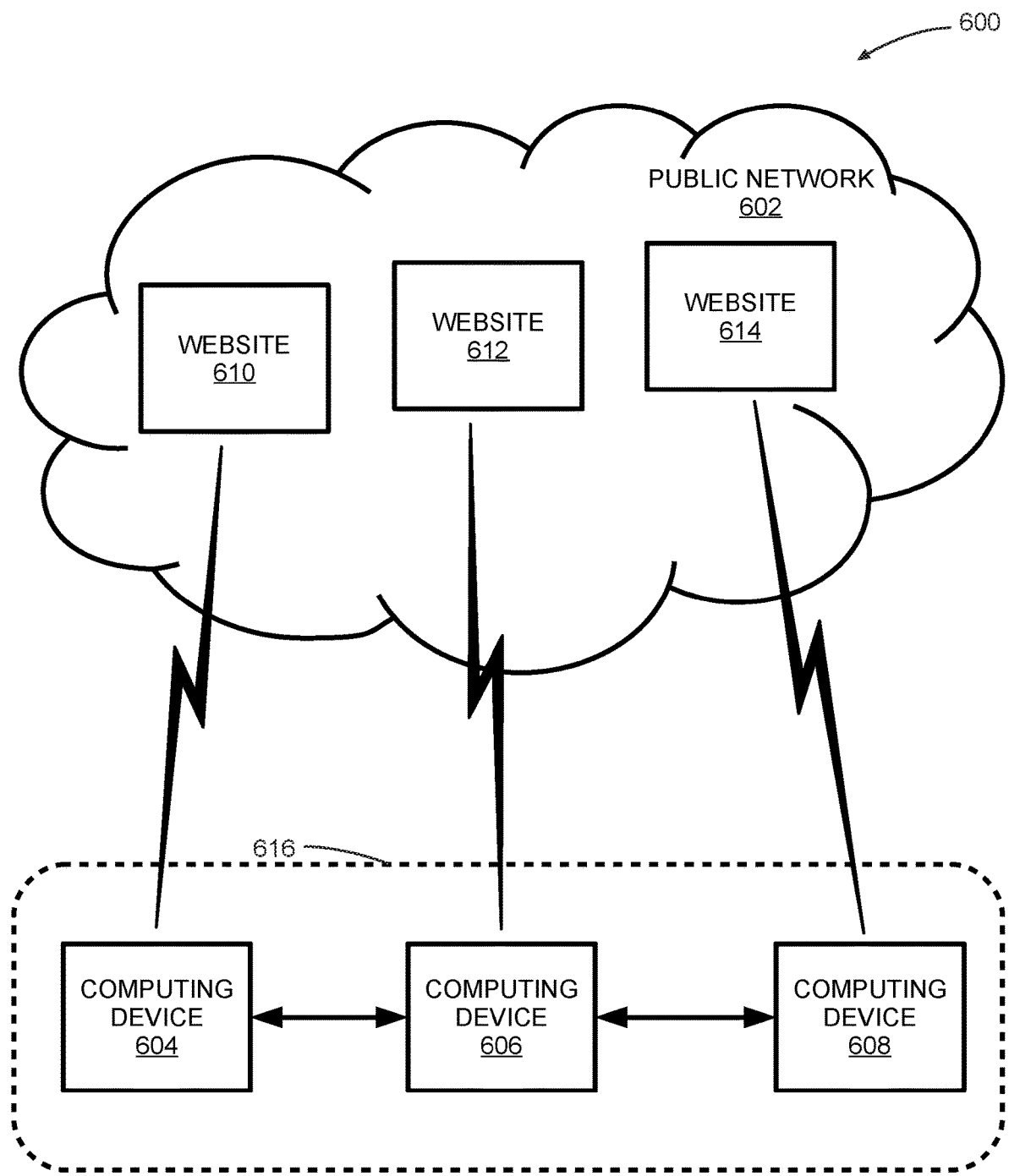
FIG. 6 depicts an example computer architecture of a network with dynamic risk propagation.

FIG. 6 depicts an example computer architecture of a network 600 with dynamic risk propagation. As depicted, network 600 includes public network 602 and computer network 616. Computer network 616 further includes computing device 604, computing device 606, and computing device 608. In embodiments, computing devices 604, 606, and 608 (and any other computing devices included in network 600) can include any combination of laptop computers, desktop computers, internet-of-things (IoT) devices, tablets, mobile devices, smart televisions, mobile phones, and so on. Public network 602 (e.g., the Internet) further includes website 610, website 612, and website 614. In an embodiment, website 610 can be a website with a bad reputation, website 612 can be an e-commerce website, and website 614 can be an update website that is configured to provide software update downloads to a connected computing device. In an embodiment, computer network 616 is configured such that computing device 604 is connected to computing device 606, and computing device 606 is connected to computing device 608 as shown in FIG. 6.

In an embodiment, computing device 604 may be a laptop computer that communicates with website 610, computing device 606 may be a mobile phone (an example of an IoT device) that communicates with website 612, and computing device 608 may be a television (an example of an IoT device) that communicates with website 614. Each of computing device 604, computing device 606, and computing device 608 may be associated with a static risk score (SRS) of 55, 34, and 12 respectively. Computing device 608 has the least static risk score value since it communicates with a largely trustworthy website (i.e., website 614) that provides software updates as downloads. Computing device 606 has a slightly higher static risk score since communicates with website 612 that is associated with a higher risk than website 614. Computing device 604 has the highest static risk score since it communicates with website 610 that has a bad reputation.

As shown in FIG. 6, computing devices 604, 606, and 608 are interconnected. In an embodiment, computing device 604 and computing device 606 may be connected via a combination of a WiFi interface and a Bluetooth interface, while computing device 606 and computing device 608 may be connected via a Bluetooth interface.

A static risk score associated with each of computing devices 604, 606, and 608 is propagated (i.e., transposed) through computer network 616, where a behavior of each computing device dynamically affects a risk associated with the other devices. Due to computing device 604 communicating with a website with a bad reputation, computing device 604 has a high dynamic risk score (DRS) of 89.

The dynamic risk score of computing device 604 propagates throughout the network, resulting in computing device 606 and computing device 608 having dynamic risk scores of 81 and 73 respectively. These dynamic risk scores are higher than the individual static risk scores of computing devices 606 and 608. Hence, computing device 608 which is statically considered to be a relatively safe device is actually at higher risk due to its interactions with other computing devices on computer network 616. Using this approach, an administrator associated with computer network 616 can observe how each computing device association and interaction contributes to risk throughout computer network 616.

In some embodiments, dynamic and static risk scores might be interpreted as a likelihood and an impact, respectively. A dynamic risk score (DRS) represents a risk due to online activity associated with a computing device, and a static risk score (SRS) represents a risk due to any existing internal security vulnerabilities of the computing device. In general, the higher the DRS, the higher the likelihood of harm; and the higher the SRS, the higher the impact of the harm would be.

Figure 7:
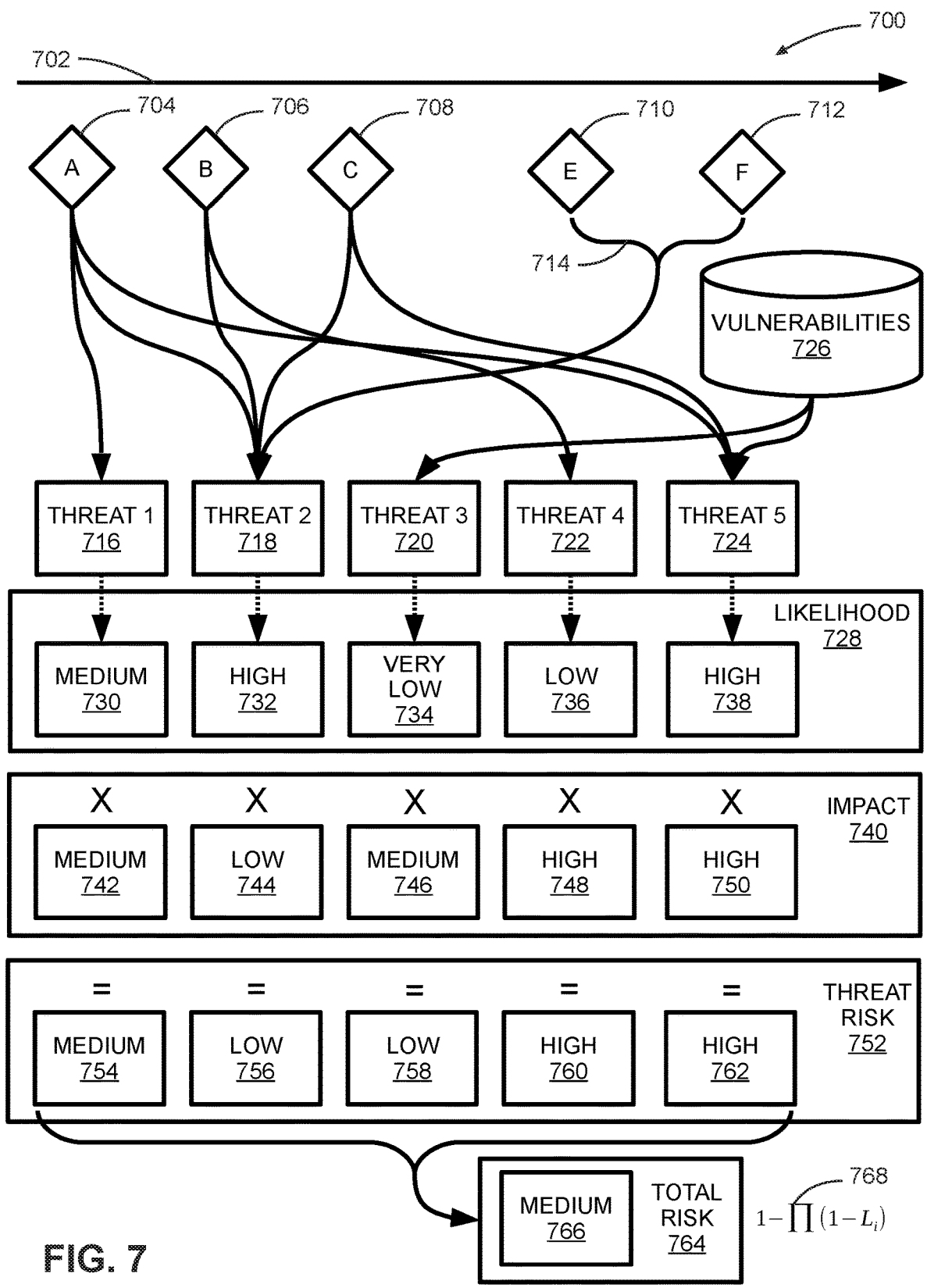
FIG. 7 depicts an example schematic diagram of a risk assessment workflow.

FIG. 7 depicts an example schematic diagram of a risk assessment workflow 700. FIG. 7 depicts how risk assessment is done for one or more computing devices. Risk-factors are mapped to threat categories. A risk associated with each threat category is calculated using its likelihood and impact. All threat risks are combined to calculate the overall risk for a device.

As depicted, workflow 700 includes timeline 702. A plurality of incidents—an incident A 704, an incident B 706, an incident C 708, an incident E 710, and an incident F 712—are temporally mapped to timeline 702. In other words, each of incident A 704 through incident F 712 occurs at a point in time that is represented on timeline 702.

In some embodiments, each of incident A 704 through incident F 712 is mapped to a threat. Specifically, incident A 704 is mapped to threat 1 716, threat 2 718, and threat 5 724. Incident B 706 is mapped to threat 2 718, and threat 4 722. Incident C 708 is mapped to threat 2 718, and threat 5 724. Incident E 710 and incident F 712 are combined together by an event correlation 714 and collectively mapped to threat 2 718. Event correlation 714 essentially determines that two or more incidents have similar characteristics, combines these incidents, and collectively maps the event combination to a threat. Collective mapping may also be performed when two or more different incidents occur for the same device within a short period of time (e.g., within 10 minutes of each other).

Vulnerabilities 726 can be a database that includes one or more network vulnerabilities associated with a computer network being subject to incident A 704 through incident F 712, and other incidents not depicted in FIG. 7. Vulnerabilities 726 is mapped to threat 3 720 and to threat 5 724. As depicted in FIG. 7, more than one incident or vulnerability can be mapped to a specific threat.

In some embodiments, workflow 700 determines likelihood 728, a measure of a likelihood of a threat happening. Each of threat 1 716 through threat 5 724 is associated with a unique likelihood that can take values ranging from very low, low, medium, high, or very high. As shown in FIG. 7, threat 1 716 is associated with medium 730, where medium 730 represents a low likelihood of threat 1 716 occurring. Similarly, threat 2 718 is associated with high 732, threat 3 720 is associated with very low 734, threat 4 722 is associated with low 736, and threat 5 724 is associated with high 738. As seen in FIG. 7, medium 730 through high 738 are likelihood measures.

In some embodiments, likelihood 728 is multiplied element-wise by an impact 740, where impact 740 is a measure of an impact associated with each threat. Results of the multiplication yield a threat risk 752. Threat risk 752 may include one or more threat risks associated with one or more threats. Essentially, workflow 700 implements a functionality of threat risk score calculator 502. An impact can be associated with different values, such as low, medium and high. A threat risk can be associated with different values such as low, medium and high.

As depicted in FIG. 7, medium 730 (likelihood) is multiplied by medium 742 (impact) to give medium 754 (threat risk). High 732 (likelihood) is multiplied by low 744 (impact) to give low 756 (threat risk). Very low 734 (likelihood) is multiplied by medium 746 (impact) to give low 758 (threat risk). Low 736 (likelihood) is multiplied by high 748 (impact) to give high 760 (threat risk). High 738 (likelihood) is multiplied by high 750 (impact) to give high 762 (threat risk). Formula 768 is a mathematical representation of overall likelihood, as described earlier.

Figure 8A:
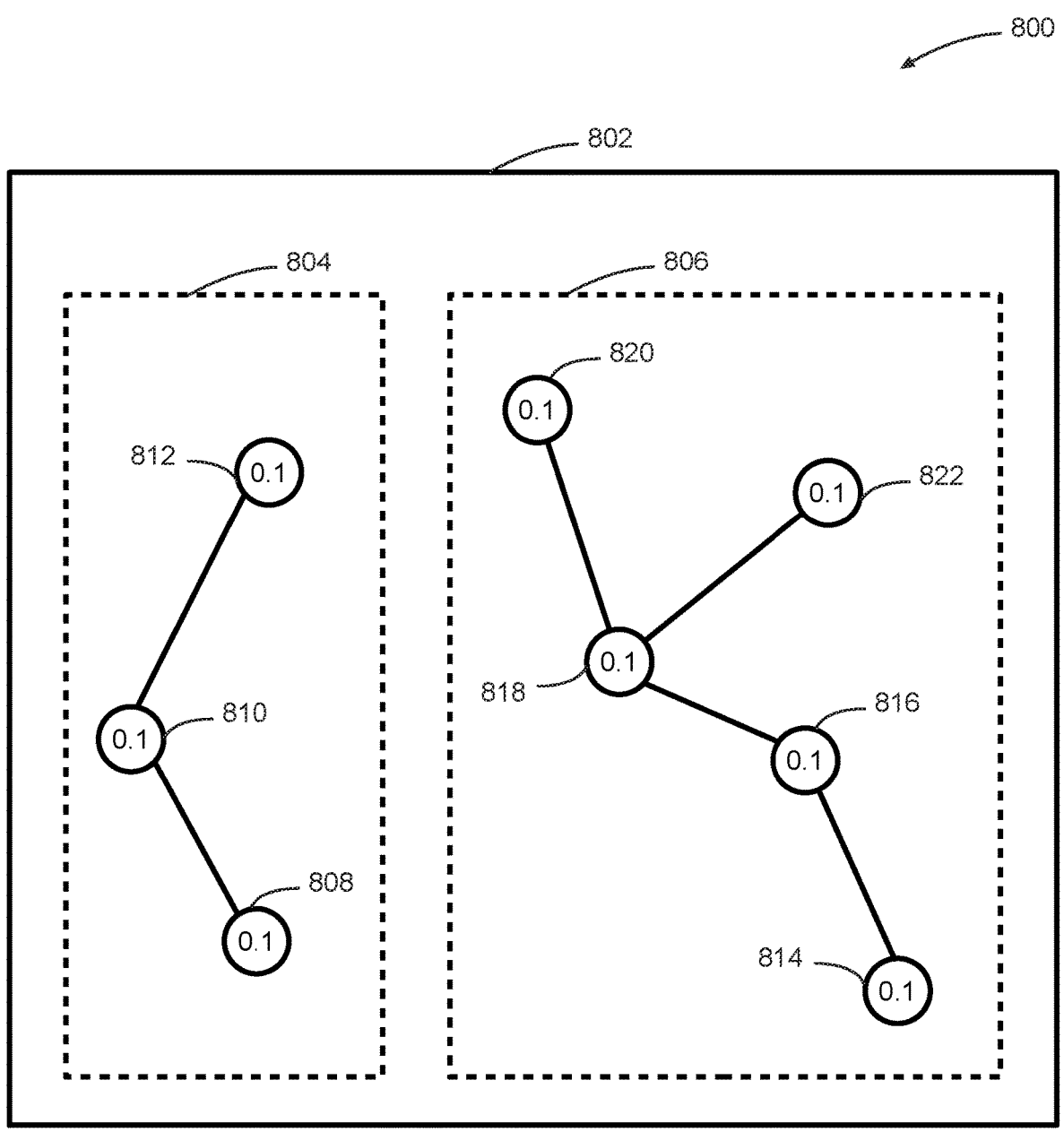
FIGS. 8A through 8C depict example schematic diagrams of a dynamic risk propagation workflow.

FIG. 8A is an example schematic diagram of a dynamic risk propagation flow 800. As depicted, dynamic risk propagation flow includes network 802, for example, a computer network. Network 802 further includes a subnetwork 804 and a subnetwork 806. Subnetwork 804 includes node 808, node 810, and node 812. Each of node 808, node 810, and node 812 can represent a computing device, and can be associated with a risk score. As depicted risk scores for nodes 808, 810, and 812 are each equal to 0.1. Similar to subnetwork 804, subnetwork 806 includes node 814, node 816, node 818, node 820, and node 822, each of which has a risk score of 0.1.

Figure 8B:
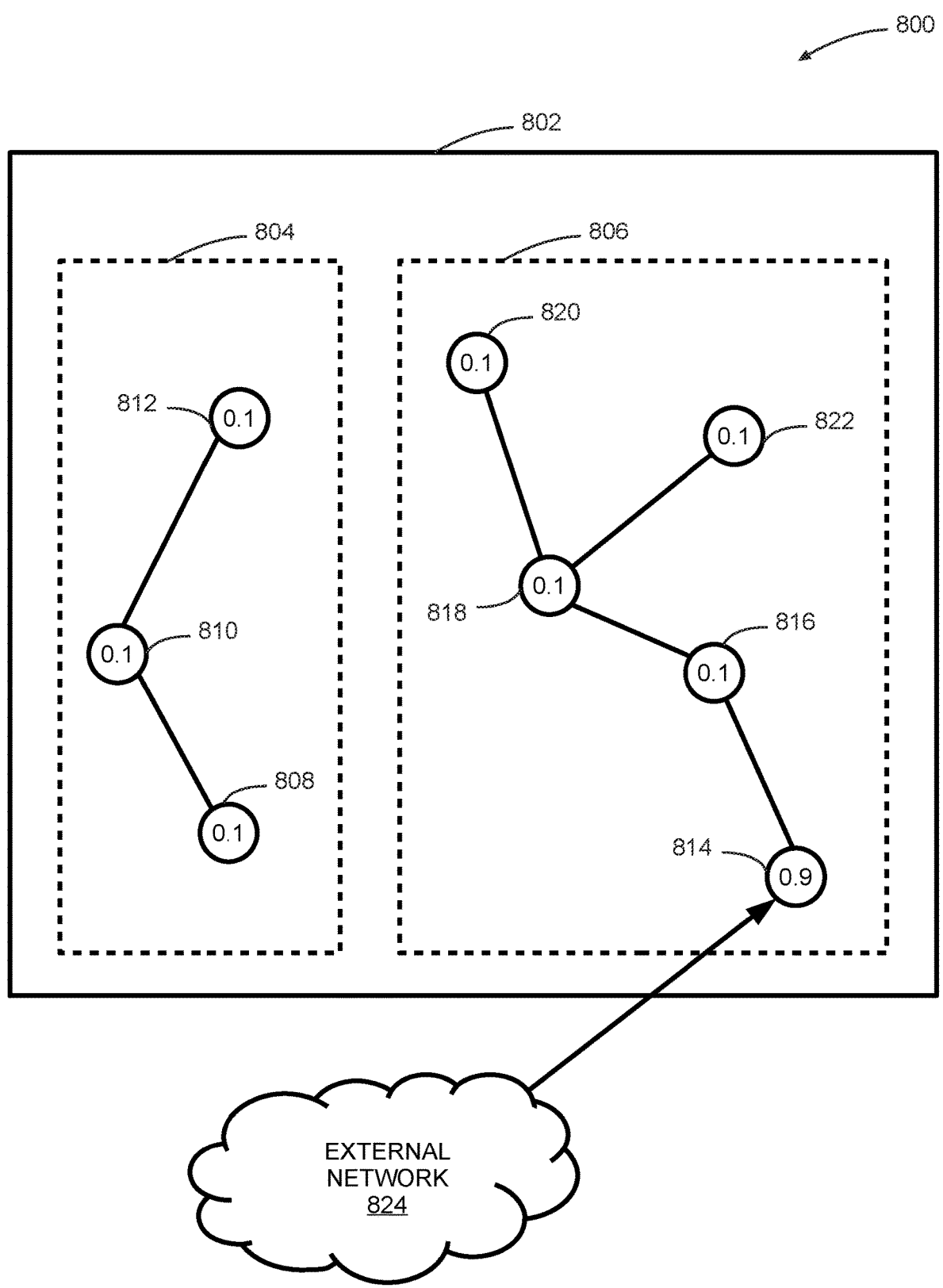

FIG. 8B is a continued description of dynamic risk propagation flow 800. FIG. 8B shows the risk score associated with node 814 being increased to 0.9 due to an influence of an external network 824. External network 824 may have certain characteristics (e.g., bad reputation, known hacker site, etc.) that increase a risk associated with node 814.

Figure 8C:
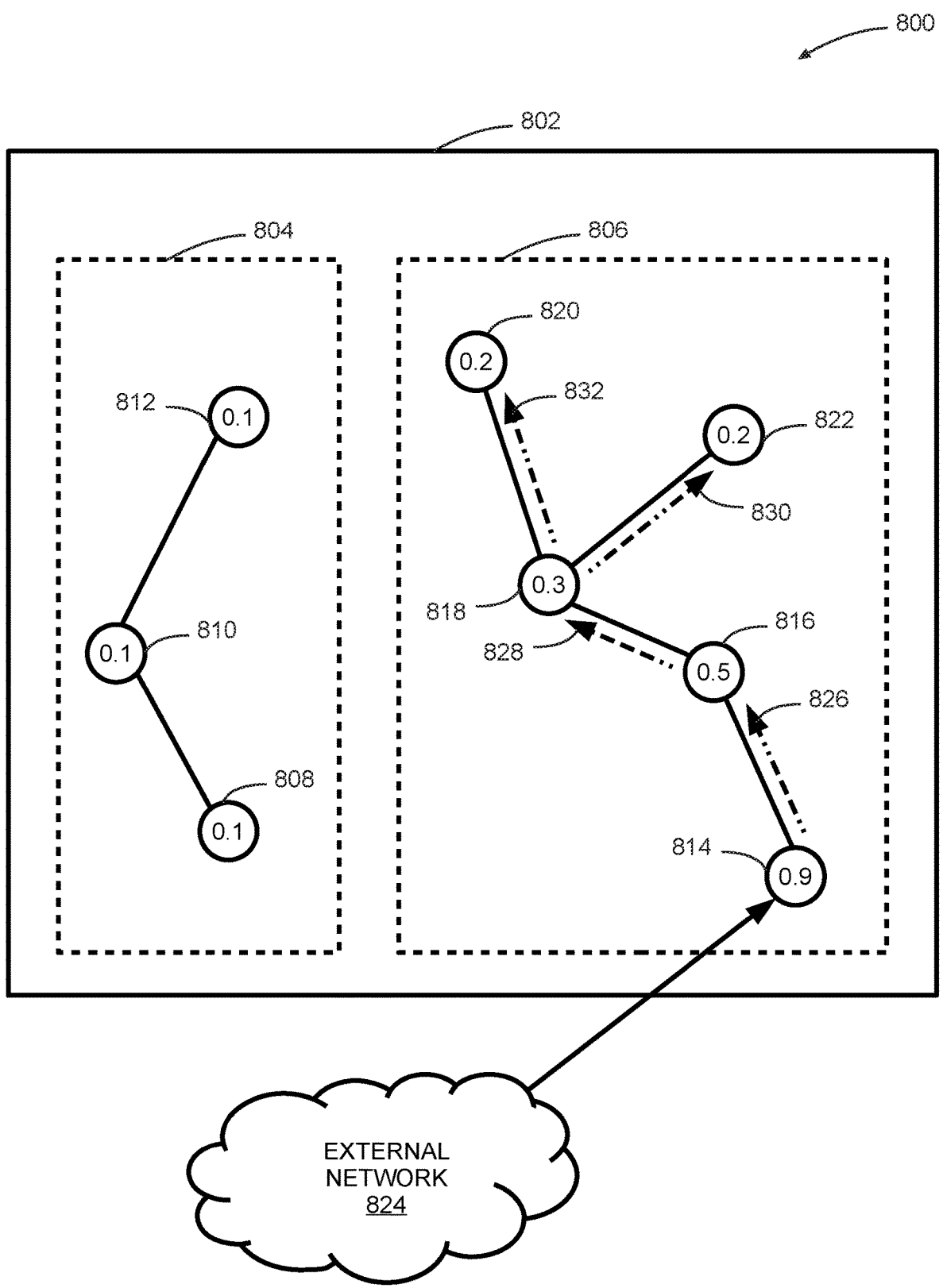

FIG. 8C is a continued description of dynamic risk propagation flow 800. FIG. 8 depicted risk dynamically propagating through subnetwork 806. As described, the influence of external network 824 raises the risk score associated with node 814 from 0.1 to 0.9. This risk propagates through subnetwork 806, via path 826 to node 816, then via path 828 to node 818, and then via path 832 to node 820, and via path 830 to node 822. Risk propagation raises the risk score associated with these nodes to 0.5, 0.3, 0.2, and 0.2 respectively. Risk propagates at least in part due to node 814 being communicatively coupled to node 816, which is communicatively coupled to node 818, which is communicatively coupled to node 820 and to node 822. On the other hand, there is no change in the static risk score of any node in subnetwork 804, since there is no communicative coupling between any of the nodes of subnetwork 804 and subnetwork 806, and no communicative coupling between the nodes of subnetwork 804 and network 824.

To summarize, dynamic risk propagation flow 800 depicts a propagation of risk across a network of connected devices. An external risk-factor causes an overall risk of one node to increase. In turn, risk associated with adjacent devices on the network is also increased.

Figure 9:
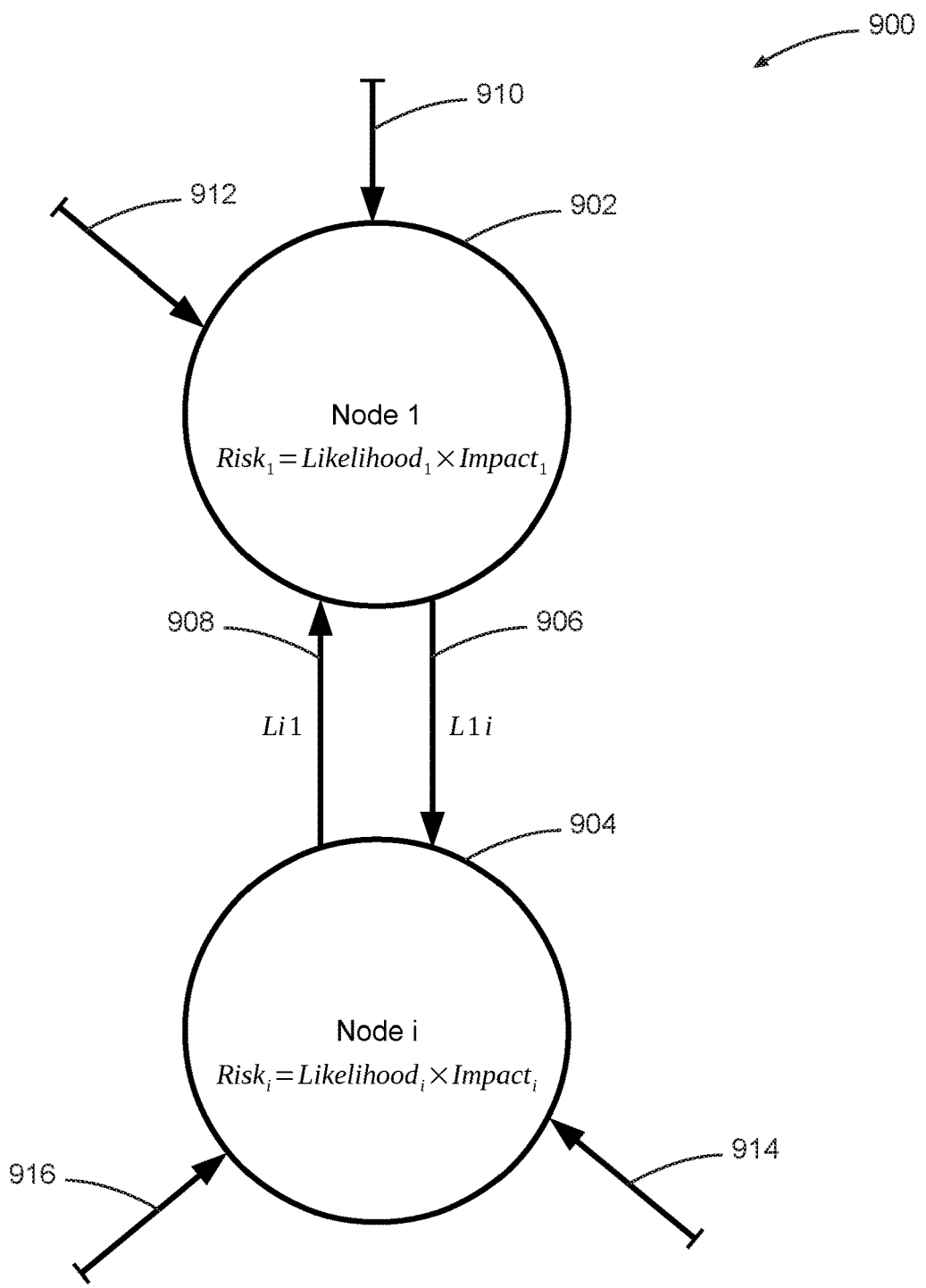
FIG. 9 depicts an example schematic diagram of an inter-nodal risk propagation workflow.

FIG. 9 depicts an example, schematic diagram of an inter-nodal risk propagation flow 900. As depicted, inter-nodal risk propagation flow 900 includes node 1 902 with a calculated risk:

$$Risk_1 = Likelihood_1 \times Impact_1$$

Node 1 902 can be a computing device that is communicatively coupled with other nodes (i.e., computing devices) in an associated network via, for example, a communication link 910 and a communication link 912.

As depicted inter-nodal risk propagation flow 900 also includes node i 904 with a calculated risk:

$$Risk_i = Likelihood_i \times Impact_i$$

Node i 904 can also be a computing device that is communicatively coupled with other nodes (i.e., computing devices) in the associated network via, for example, a communication link 914 and a communication link 916.

Node 1 902 and node i 904 are communicatively coupled via a communication link 906 from node 1 902 to node i 904, and a communication link 908 from node i 904 to node 1 902. In FIG. 9, $L_{1i}$ represents an effect of $Likelihood_1$ on $Likelihood_i$, while $L_{1i}$ represents an effect of $Likelihood_i$ on $Likelihood_1$. Treating $L_{i1}$ as an internal risk factor, $Likelihood_1$ is modeled as a function of all external risk factors ($RF_1$) and internal risk factors ($L_{21}, \ldots, L_{i1}, \ldots, L_{m1}$):

$$Likelihood_1 = f(RF_1, L_{21}, \ldots, L_{m1})$$

Also, $$L_{i1} = f(RF_i, L_{2i}, \ldots, L_{mi})$$

$$L_{ik} = f(RF_i, L_{2i}, \ldots, L_{mi}, except L_{ki})$$

$$Likelihood_i = f(RF_i, L_{2i}, \ldots, L_{mi})$$

Figure 10:
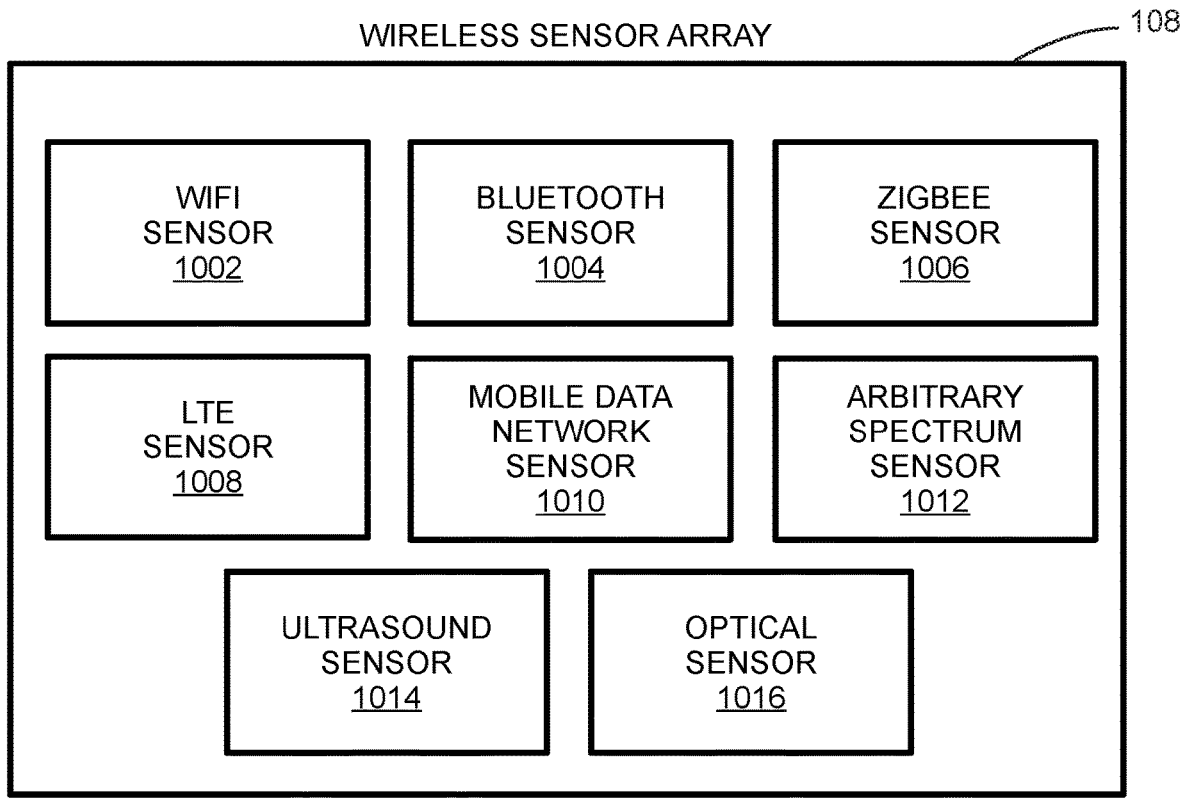
FIG. 10 depicts an example architecture of a wireless sensor array.

FIG. 10 depicts an example architecture of wireless sensor array 108. As depicted, wireless sensor array includes WiFi sensor 1002, Bluetooth sensor 1004, Zigbee sensor 1006, LTE sensor 1008, mobile data network sensor 1010, arbitrary spectrum sensor 1012, ultrasound sensor 1014, and optical sensor 1016.

Wireless sensor array 108 can be configured to scan a physical area in a vicinity of a computer network, such as, for example, computer network 116, Wireless sensor array 108 can detect any RF spectrum signals associated with the area and any non-RF wireless signals associated with the area. Wireless sensor array can also detect and receive any data communication packets associated with the RF signals and the non-RF wireless signals. Essentially, wireless sensor array 108 scans the RF and other spectrum to determine any existing RF communication signals and/or any non-RF wireless communication signals being used by computing devices, such as, for example, by 102, 104, or 106.

WiFi sensor 1002 can be configured to detect and receive any WiFi communication packets being used for communication, for example, by computing devices 102, 104, or 106 over the associated communication network, for example, computer network 116. In some embodiments, WiFi sensor 1002 is a WiFi packet sniffer.

Bluetooth sensor 1004 can be configured to detect and receive any Bluetooth communication packets being used for communication, for example, by computing devices 102, 104, or 106, via one or more peer-to-peer Bluetooth communication links. In some embodiments, Bluetooth sensor 1004 is a Bluetooth packet sniffer.

ZigBee sensor 1006 can be configured to detect and receive any ZigBee communication packets being used for communication by, for example, computing devices 102, 104, or 106 via a ZigBee communication link. In some embodiments, ZigBee sensor 1006 is a ZigBee packet sniffer.

LTE sensor 1008 can be configured to detect long term evolution (LTE) signals being used for communication, for example, by computing devices 102, 104, and 106.

Mobile data network sensor 1010 can be configured to detect communication, for example, by computing devices 102, 104, or 106, via other mobile data communication techniques, such as, General Packet Radio Service (GPRS), 3G, 3G+4G, 4G+5G, Global System for Mobile Communications (GSM), Universal Mobile Telecommunications Service (UMTS), and so on.

Arbitrary spectrum sensor 1012 can be configured to detect and receive RF communication data associated with any arbitrary RF communication protocol used by, for example, computing devices 102, 104, or 106.

In addition to sensors to detect RF communication signals, wireless sensor array 108 can include components capable of detecting non-RF wireless signals, such as, ultrasound communication signals and optical communication signals. More specifically, ultrasound sensor 1014 can be configured to detect communication data associated with any ultrasonic (ultrasound) communication links used by, for example, computing devices 102, 104, or 106. Optical sensor 1016 can be configured to detect communication data associated with any wireless optical data links used by, for example, computing devices 102, 104, or 106.

Figure 11:
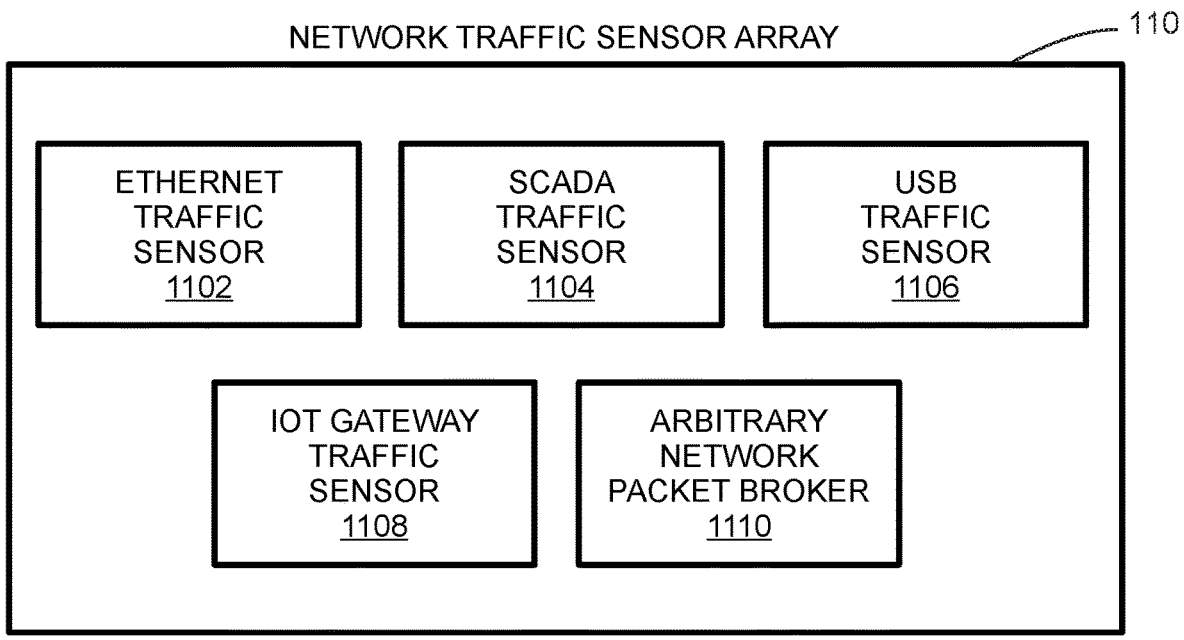
FIG. 11 depicts an example architecture of a network traffic sensor array.

FIG. 11 depicts an example architecture of a network traffic sensor array 110. As depicted, network sensor array 110 includes ethernet traffic sensor 1102, SCADA traffic sensor 1104, USB traffic sensor 1106, IoT gateway traffic sensor 1108, arbitrary network packet broker 1110. In general, network traffic sensor array 110 can be configured to detect any network traffic-related communication data associated with computing devices, for example, 102, 104, or 106, on a network, for example, computer network 116.

Ethernet traffic sensor 1102 can be configured to detect, receive and process Ethernet traffic communication data associated with computing devices, for example, 102, 104, or 106. SCADA traffic sensor 1104 can be configured to detect, receive and process SCADA communication data associated with computing devices, for example, 102, 104, or 106. USB traffic sensor 1006 can be configured to detect, receive and process USB communication data associated with computing devices, for example, 102, 104, or 106.

IoT gateway traffic sensor 1108 can be configured to detect, receive, and process communication data associated with Internet-of-Things (IoT) devices. Arbitrary network packet broker 1110 can be configured to detect, receive and process arbitrary network packets received by network traffic sensor array 110.

Figure 12:
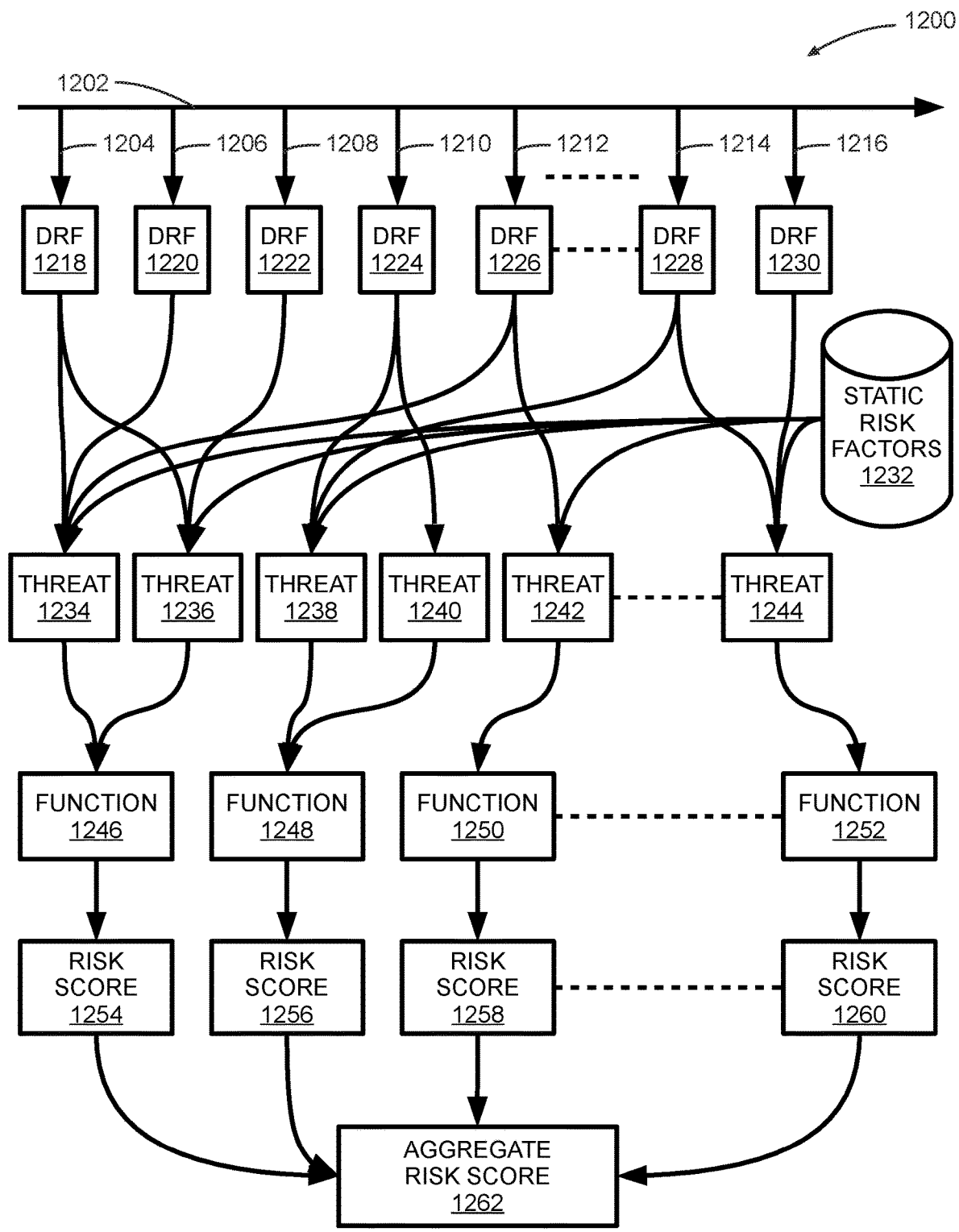
FIG. 12 depicts an example schematic diagram of a risk assessment workflow.

FIG. 12 depicts an example schematic diagram of a risk assessment workflow 1200. Risk assessment workflow 1200 depicts how one or more incidents are mapped to one or more threats, and how an aggregate risk score is calculated. A timeline 1202 provides a temporal reference to one or more incidents that occur related to communication associated with a computer network. In one embodiment, an incident 1204, an incident 1206, an incident 1208, an incident 1210, an incident 1212, through an incident 1214 and an incident 1216 are each respectively mapped to a Dynamic Risk Factor (DRF) 1218, a DRF 1220, a DRF 1222, a DRF 1224, a DRF 1226, through a DRF 1228 and a DRF 1230 respectively. Static risk factors database 1232 can stores one or more static risk factors. The static risk factors can be with one or more dynamic risk factors and mapped to one or more functions. In particular embodiments, the static risk factors included in static risk factors 1232 may be further classified or grouped as network factors, IT factors, network vulnerabilities and so on.

As depicted, DRF 1218, DRF 1220, and DRF 1226 are combined with one or more static risk factors from static risk factors 1232 and mapped to a threat 1234. DRF 1218 and DRF 1222 are combined with one or more static risk factors from static risk factors 1232 and mapped to a threat 1236. DRF 1224 is combined with DRF 1228 and one or more static risk factors from static risk factors 1232 and mapped to a threat 1238. DRF 1224 is mapped to a threat 1240. DRF 1226 is combined with one or more static risk factors from static risk factors 1232 and mapped to a threat 1242, and so on, through DRF 1228 being combined with DRF 1230 and one or more static factors and being mapped to a threat 1244.

Combinations of threat 1234 through threat 1244 can be mapped to one or more functions. For example, threat 1234 and threat 1236 are combined and mapped to a function 1246, threat 1238 and threat 1240 are combined and mapped to a function 1248, threat 1242 is mapped to a function 1250, and so on, through threat 1244 being mapped to a function 1252. Each of function 1246 through function 1252 can be a function associated with an organization, such as, a business, an educational institution, a hospital, and so on. Examples of functions (also referred to as "organization functions") include security, information technology (IT), system development, and so on. Specifically, functions can be described as security operations, IT operations, network operations, and so on, respectively.

In some embodiments, a risk score is computed for each function. More specifically, a risk score 1254 is calculated for function 1246, a risk score 1256 is calculated for function 1248, a risk score 1258 is calculated for function 1250, and so on, with a risk score 1260 being calculated for function 1252. Each of risk score 1254 through risk score 1260 can be generated based on some combination of one or more static risk factors and one or more dynamic risk factors. An aggregate risk score 1262 is computed by combining risk score 1254 through risk score 1260.

In some embodiments, a risk score is computed per site. A per site risk score can be a combination of a composite device risk score and a function risk score. The composite device risk score can be computed by calculating a risk per computing device associated with the site. The function risk score cam be computed by calculating a risk per function. A total site risk score can be computed as a combination of the composite device risk score and a combined function risk score calculated over all functions associated with the site.

In some embodiments, an occurrence of an incident increases a threat score associated with a computing device corresponding to the incident. A risk score associated with the computing device is dependent in part on how much the computing device is communicating with other devices and a functionality associated with the computing device. In general, a site risk score is a combination of a device risk score calculated over all computing devices associated with the site, and a function risk score calculated over all computing devices associated with the function. In some embodiments, a hyper context associated with a computing device may be included as a factor while computing a total risk score for a site.

Figure 13:
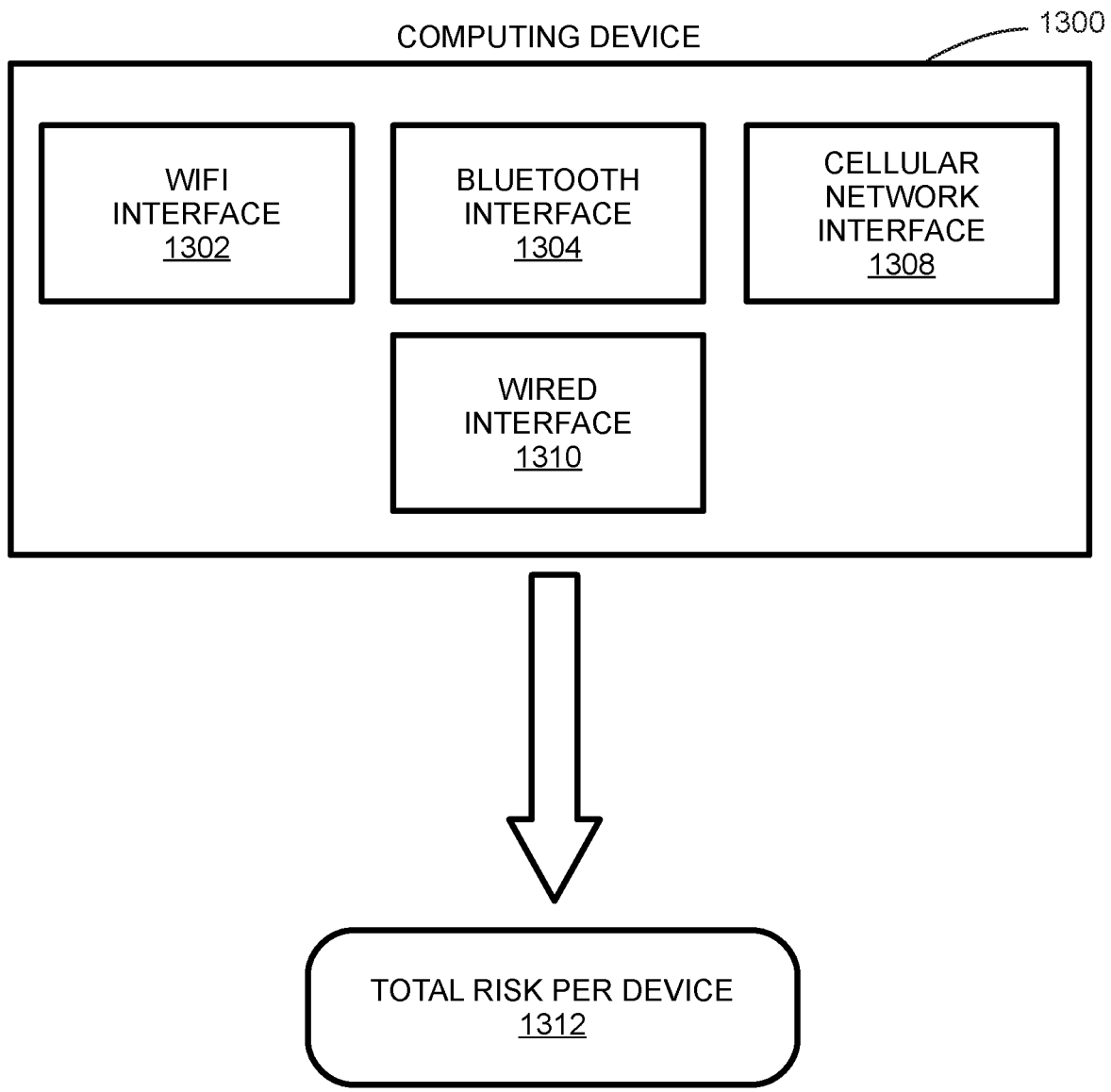
FIG. 13 depicts an example architecture of a computing device.

FIG. 13 depicts an example architecture of a computing device 1300. As depicted, computing device 1300 includes WiFi interface 1302, Bluetooth interface 1304, cellular network interface 1308, and wired interface 1310. Computing device 1300 may be representative of any of computing devices 102, 104, or 106 or any other computing device associated with computer network 116.

WiFi interface 1302 can be configured to interface and communicatively couple computing device 1300 with a WiFi network. Bluetooth interface 1304 can be configured to interface and communicatively couple computing device 1300 with one or more Bluetooth devices.

Cellular network interface 1308 can be configured to interface and communicatively couple computing device 1300 with a cellular network. Wired interface 1308 can be configured to interface and communicatively couple computing device 1300 with external devices using wired interfaces such as Ethernet or USB.

In some embodiments, communication data associated with one or more of WiFi interface 1302, Bluetooth interface 1304, cellular network interface 1308, and wired interface 1310 is used to calculate total risk per device 1312. In embodiments, risks from all interfaces associated with computing device 1300 are merged to compute total risk per device 1312. A color-coded scheme (e.g., red for high-risk computing device, orange for a medium-high risk computing device, yellow for a medium-risk computing device, and green for a low-risk computing device) may be used to alert an operator or user of computer architecture 100.

Figure 14:
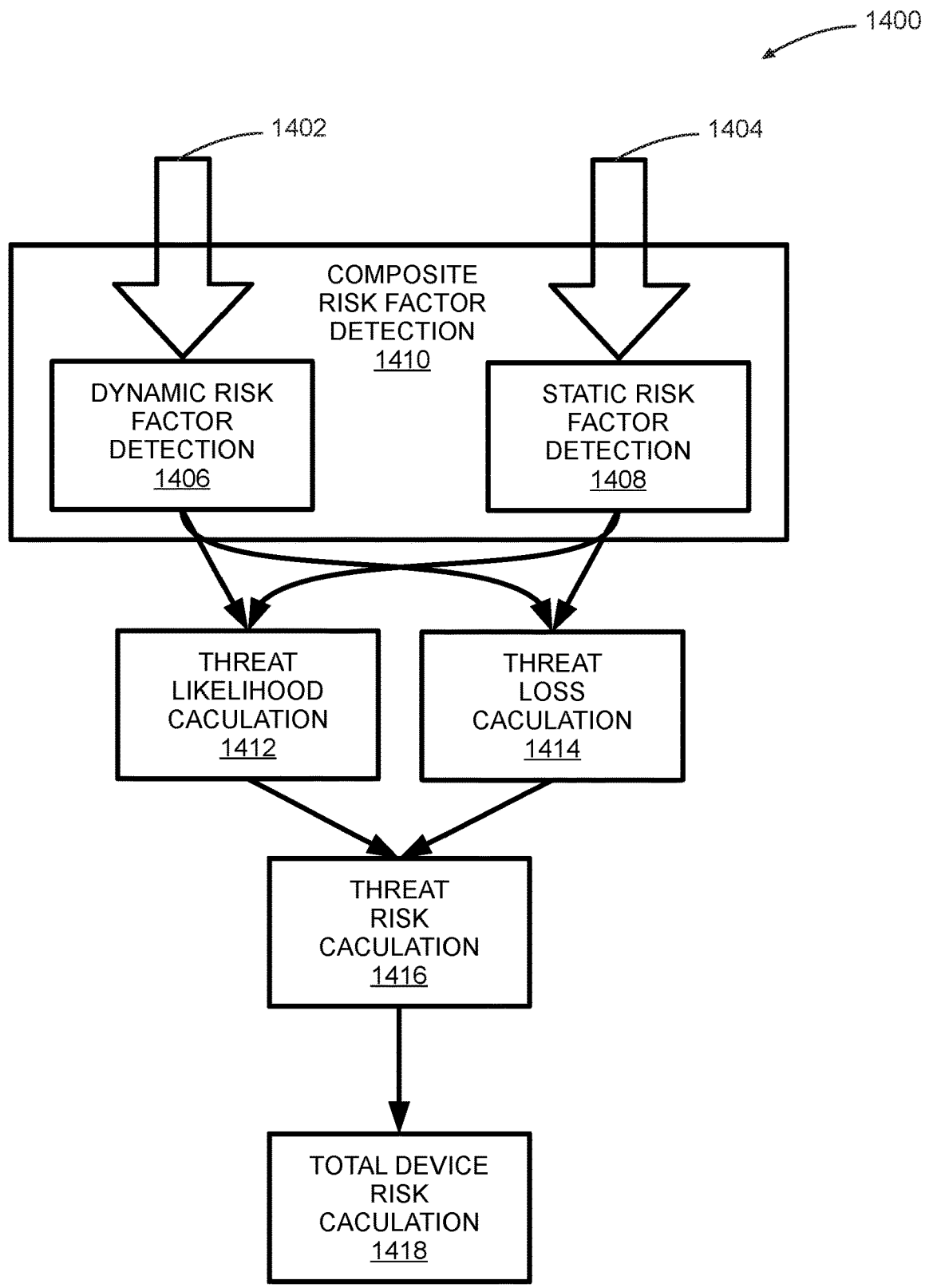
FIG. 14 depicts an example schematic diagram of a total device risk calculation workflow.

FIG. 14 depicts an example schematic diagram of a total device risk calculation workflow 1400. As depicted, device risk calculation workflow 1400 includes network traffic channel 1402, network traffic channel 1404, composite risk factor detection 1410, threat likelihood calculation 1412, threat loss calculation 1414, threat risk calculation 1416, and total device risk calculation 1418. Composite risk factor detection 1410 further includes dynamic risk factor detection 1406 and static risk factor detection 1408.

Data received over a network traffic channel 1402 can be used to generate dynamic risk factor detection 1406. Dynamic risk factor detection 1406 represents a detection of one or more dynamic risk factors based on one or more incidents as depicted by, for example, FIG. 12 or method 300. Data received over network traffic channel 1404 can be used to generate a static risk factor detection 1408. In some embodiments, data from network traffic scan may be stored as one or more static risk factors in a database, such as, static risk factors 1232. Collectively, dynamic risk factor detection 1404 and static risk factor detection 1408 are classified as composite risk factor detection 1410.

Dynamic risk factor detection 1406 and static risk factor detection 1408 are collectively used to compute threat likelihood calculation 1412 and threat loss calculation 1414. Threat likelihood calculation 1412 can represent a measure of how likely a threat occurrence is. Threat loss calculation 1414 can represent a measure of a loss that would occur due to a threat.

In some embodiments, threat likelihood calculation 1412 and threat loss calculation 1414 are combined (e.g., by multiplication, as described earlier) to compute a threat risk calculation 1416 that is measure of a risk associated with a particular threat. Threat risk calculation 1416 is used to compute a total device risk calculation 1418, which is a total risk associated with a computing device affected by the threat. In essence, total device risk calculation 1418 is a measure of a total risk per computing device in a computer network.

Figure 15:
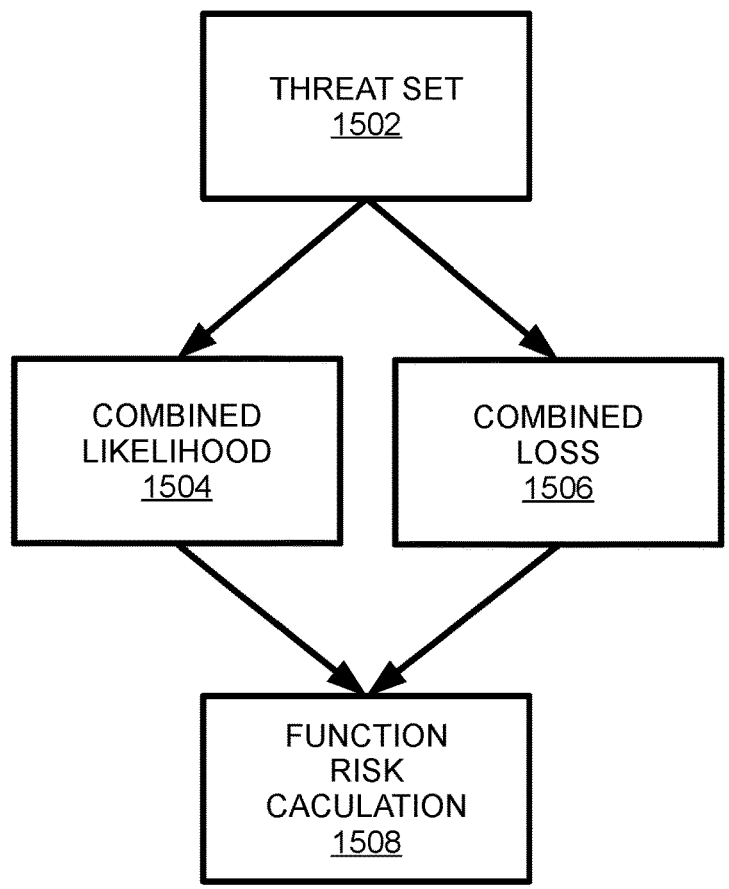
FIG. 15 depicts an example schematic diagram of a function risk calculation workflow.

FIG. 15 depicts an example schematic diagram of a function risk calculation workflow 1500. As depicted, threat set 1502 is used to generate a combined likelihood 1504 and a combined loss 1506. Threat set 1502 can be a set of threats that is relevant to a specific function. Combined likelihood 1504 is a measure of a combined likelihood of one or more threats occurring Combined loss 1506 is a measure of a combined loss resulting from the threats. Together, combined likelihood 1504 and combined loss 1506 can be used to compute function risk calculation 1508 that is associated with a specific function in an organization.

Figure 16:
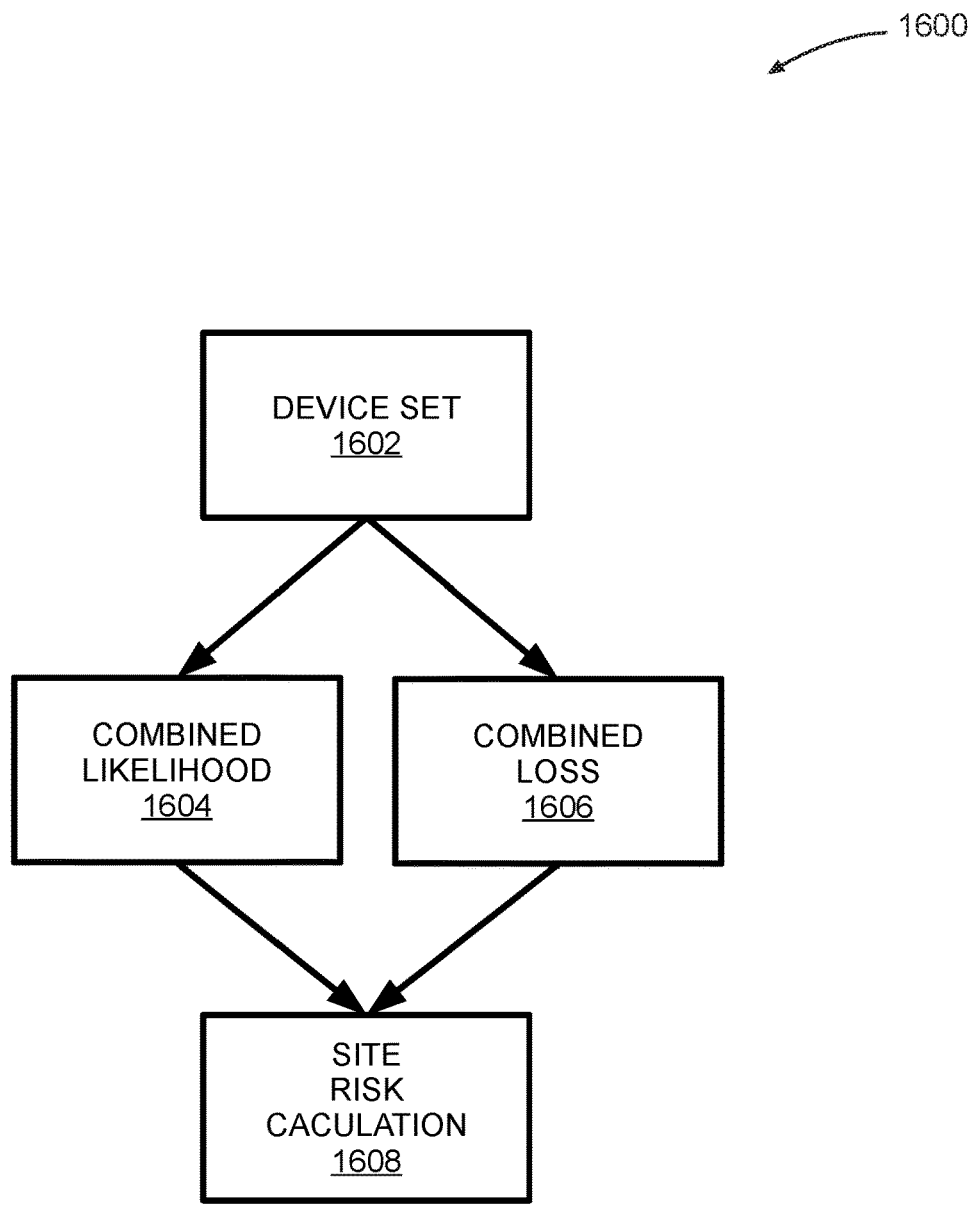
FIG. 16 depicts an example schematic diagram of a site risk calculation workflow.

FIG. 16 depicts an example schematic diagram of a site risk calculation workflow 1600. As depicted, a device set 1602 is used to generate a combined likelihood 1604 and a combined loss 1606. Device set 1602 can be a set of computing devices present at a specific site. Combined likelihood 1604 is a measure of a combined likelihood of one or more threats occurring over all devices. Combined loss 1606 is a measure of an associated combined loss resulting from the threats, over all devices. Together, combined likelihood 1604 and combined loss 1606 can be used to compute a site risk calculation 1608 that is a risk associated with all computing devices at a specific site.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method to determine an aggregate risk score for a site that includes a computer network, the computer network further including a plurality of computing devices, the method comprising:
   a network gateway receiving communication data communicated by the computing devices over the computer network;
   a computing system receiving the communication data from the network gateway;
   the computing system generating a first dynamic risk factor associated with a first incident at the site based on the communication data;
   the computing system generating a second dynamic risk factor associated with a second incident at the site based on the communication data;
   the computing system retrieving one or more static risk factors from a database;
   the computing system mapping the one or more static risk factors, the first dynamic risk factor, and the second dynamic risk factor to a first threat, wherein each of the static risk factor, the first dynamic risk factor, and the second dynamic risk factor is determined based on an age of the corresponding risk factor, wherein an age of a dynamic risk factor is defined based on an age of an associated incident, and an age of a static risk factor is defined based on a time elapsed since last packet activity associated with an associated computing device, and wherein each age is included in an exponent of an associated exponential weighting function that further includes a forget factor;
   the computing system computing a first threat risk score associated with the first threat, wherein the first threat risk score is generated based on the first dynamic risk factor, the second dynamic risk factor, and the static risk factors;
   the computing system computing a second threat risk score associated with a second threat;
   the computing system computing a first total risk associated with a first computing device included in a computer network associated with the site based on the first threat risk score and the second threat risk score;

the computing system computing a second total risk associated with a second computing device included in the computer network; and the computing system aggregating the first total risk and the second total risk to compute the aggregate risk score associated with the site.

2. The method of claim 1, further comprising storing the first dynamic risk factor and the second dynamic risk factor in the database.

3. The method of claim 2, wherein the first dynamic risk factor and the second dynamic risk factor are each stored in the database for a period of 30 days.

4. The method of claim 1, wherein the first static risk factor is generated by a first network scan, and the second static risk factor is generated by a second network scan.

5. The method of claim 1, wherein the first total risk score, the second total risk score, and the aggregate risk score each has a value between 0 and 100.

6. The method of claim 1, wherein the first total risk score is dependent on a likelihood of the first threat occurring and a loss if the first threat occurs.

7. The method of claim 6, wherein the likelihood is modeled using a Poisson distribution.

8. The method of claim 6, wherein the loss depends at least in part on a weighted severity and an impact associated with the first threat.

9. The method of claim 8, wherein the weighted severity depends at least in part on a severity associated with the first threat and an age of the first threat.

10. The method of claim 1, wherein the aggregate risk score depends at least in part on an overall likelihood, an overall severity, and overall impact associated with at least the first threat and the second threat.

11. An apparatus to generate an aggregate risk score, the apparatus comprising:
a computer network associated with a site, the computer network including a plurality of computing devices;
a database configured to store a plurality of static risk factors associated with the computer network;
a network gateway configured to receive communication data associated with the computing devices; and
a computing system communicatively coupled to the network gateway, the computing system being configured to receive the communication data from the network gateway, generate a first dynamic risk factor associated with a first incident at the site based on the communication data, generate a second dynamic risk factor associated with a second incident at the site based on the communication data, retrieve one or more static risk factors from the database, map the one or more static risk factors, the first dynamic risk factor, and the second dynamic risk factor to a first threat, compute a first threat risk score associated with the first threat, compute a second threat risk score associated with a second threat, compute a first total risk associated with a first computing device included in the computer network based on the first threat risk score and the second threat risk score, compute a second total risk associated with a second computing device included in the computer network, and aggregate the first total risk and the second total risk to compute the aggregate risk score associated with the site, wherein the first threat risk score is generated based on the first dynamic risk factor, the second dynamic risk factor, and the static risk factors, wherein each of the static risk factor, the first dynamic risk factor, and the second dynamic risk factor is determined based on an age of the corresponding risk factor, wherein an age of a dynamic risk factor is defined based on an age of an associated incident, and an age of a static risk factor is defined based on a time elapsed since last packet activity associated with an associated computing device, and wherein each age is included in an exponent of an associated exponential weighting function that further includes a forget factor.

12. The apparatus of claim 11, wherein the first dynamic risk factor and the second dynamic risk factor are stored in the database.

13. The apparatus of claim 12, wherein the first dynamic risk factor and the second dynamic risk factor are each stored in the database for a period of 30 days.

14. The apparatus of claim 11, wherein the computing devices are communicatively coupled via any combination of wireless communication protocols and wired communication protocols.

15. The apparatus of claim 14, wherein the wired communication protocols include Ethernet.

16. The apparatus of claim 14, wherein the wireless communication protocols include any combination of WiFi, Bluetooth, Bluetooth Low Energy (BLE), ZigBee, Long-Term Evolution (LTE), Lorawan, and zwave.

17. The apparatus of claim 11, wherein the computing devices are any combination of a desktop computer, a laptop computer, a mobile device, a tablet, and an IoT device.

18. The apparatus of claim 11, wherein the network gateway includes a wireless sensor array and a network traffic sensor array.

19. The apparatus of claim 18, wherein the wireless sensor array includes any combination of a WiFi sensor, a Bluetooth sensor, a ZigBee sensor, an LTE sensor, a mobile data network sensor, an arbitrary spectrum sensor, an ultrasound sensor, and an optical sensor.

20. The apparatus of claim 18, wherein the network traffic sensor array includes any combination of an Ethernet traffic sensor, a SCADA traffic sensor, a USB traffic sensor, an IoT gateway traffic sensor, and an arbitrary network packet broker.

\* \* \* \* \*